US011984633B2

(12) United States Patent
Fang et al.

(10) Patent No.: US 11,984,633 B2
(45) Date of Patent: May 14, 2024

(54) PHASE SHIFTER AND ANTENNA

(71) Applicants: Beijing BOE Technology Development Co., Ltd., Beijing (CN); BOE TECHNOLOGY GROUP CO., LTD., Beijing (CN)

(72) Inventors: Jia Fang, Beijing (CN); Feng Qu, Beijing (CN); Xiyuan Wang, Beijing (CN); Yang Zheng, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 215 days.

(21) Appl. No.: 17/622,088

(22) PCT Filed: Feb. 26, 2021

(86) PCT No.: PCT/CN2021/078045

§ 371 (c)(1),
(2) Date: Dec. 22, 2021

(87) PCT Pub. No.: WO2022/178805

PCT Pub. Date: Sep. 1, 2022

(65) Prior Publication Data

US 2023/0155266 A1 May 18, 2023

(51) Int. Cl.

| | |
|---|---|
| ***H01Q 1/50*** | (2006.01) |
| ***H01P 1/18*** | (2006.01) |
| ***H01P 3/12*** | (2006.01) |

(52) U.S. Cl.
CPC ................ *H01P 1/182* (2013.01); *H01P 3/12* (2013.01); *H01Q 1/50* (2013.01)

(58) Field of Classification Search
CPC .......... H01Q 1/286; H01Q 1/364; H01Q 3/36; H01Q 3/34; H01Q 3/38; H01Q 9/0485; H01Q 21/061; H01Q 21/065; H01P 1/18; H01P 1/182; H01P 1/183; H01P 1/184
See application file for complete search history.

(56) References Cited

U.S. PATENT DOCUMENTS 11,271,315 B2 * 3/2022 Onaka .................... H01Q 9/045
11,688,942 B2 * 6/2023 Wang .................. H01Q 21/064
343/893

(Continued)

*Primary Examiner* — Tung X Le
(74) *Attorney, Agent, or Firm* — HOUTTEMAN LAW LLC

(57) ABSTRACT

The present disclosure provides a phase shifter and an antenna, and relates to the field of communication technology. The phase shifter provided by the embodiment of the present disclosure is divided into a first feeding region, a second feeding region and a phase-shift region. The phase shifter includes: a first substrate and a second substrate provided opposite to each other, a dielectric layer provided between the first substrate and the second substrate, and a first feeding structure and a second feeding structure. The first feeding structure is electrically coupled to one end of the signal line, and the second feeding structure is electrically coupled to the other end of the signal line. The first feeding structure is located in the first feeding region; and the second feeding structure is located in the second feeding region. Recesses are formed in the first base substrate and/or in the second base substrate.

20 Claims, 20 Drawing Sheets

(56) References Cited

U.S. PATENT DOCUMENTS

| | | | | |
|---|---|---|---|---|
| 2009/0278744 | A1* | 11/2009 | Kirino | H01P 1/184 343/700 MS |
| 2012/0235881 | A1* | 9/2012 | Pan | H01Q 25/00 343/893 |
| 2015/0380789 | A1* | 12/2015 | Jakoby | H01P 1/184 343/905 |
| 2019/0103671 | A1* | 4/2019 | Dong | H01Q 1/364 |
| 2020/0381822 | A1* | 12/2020 | Orui | G02F 1/1343 |
| 2021/0408680 | A1* | 12/2021 | Xi | H01P 1/184 |
| 2021/0408681 | A1* | 12/2021 | Suzuki | H01Q 3/46 |
| 2023/0116249 | A1* | 4/2023 | Wang | H01P 1/184 343/850 |

* cited by examiner

PHASE SHIFTER AND ANTENNA

TECHNICAL FIELD

The present invention relates to the field of communication, and in particular to a phase shifter and an antenna.

BACKGROUND

A phase shifter is a device capable of adjusting a phase of a microwave signal, and has wide application in the field of radar, missile attitude control, accelerator, communication, instrument, even music or the like. A phase shifter with an adjustable dielectric layer modulates a phase of a microwave signal by changing a voltage difference between a signal line and a patch electrode to change a dielectric constant of the dielectric layer between the signal line and the patch electrode, based on the characteristics that the dielectric layer has different dielectric constants under different electric field intensities.

SUMMARY

The present invention is intended to solve at least one of the technical problems in the art, and provides a phase shifter which realizes feeding in and feeding out of signals of the phase shifter through a first feeding structure and a second feeding structure, so as to solve the issue of converting a transverse electric field of a coplanar waveguide transmission line into a longitudinal electric field in a phase shifter using the coplanar waveguide transmission line, thereby achieving a phase shifter with low transmission loss.

In a first aspect, an embodiments of the present disclosure provides a phase shifter, which is divided into a first feeding region, a second feeding region and a phase-shift region, the phase shifter includes a first substrate and a second substrate arranged opposite to each other, and a dielectric layer between the first substrate and the second substrate; the first substrate includes a first base substrate, and a signal line and a reference electrode provided on a side of the first base substrate close to the dielectric layer; and the signal line and the reference electrode are located in the phase-shift region; the signal line includes a main structure and at least one branch structure connected to the main structure, and the at least one branch structure extends along an extending direction of the main structure; the second substrate includes a second base substrate, and at least one patch electrode provided on a side of the second base substrate close to the dielectric layer and located in the phase-shift region; the at least one patch electrode is provided corresponding to the at least one branch structure to form at least one variable capacitor; and an orthographic projection of the at least one patch electrode on the first base substrate at least partially overlaps with an orthographic projection of the at least one branch structure on the first base substrate; the phase shifter further includes a first feeding structure and a second feeding structure, the first feeding structure being electrically coupled to one end of the signal line, and the second feeding structure being electrically coupled to the other end of the signal line; the first feeding structure being located in the first feeding region; and the second feeding structure being located in the second feeding region; and at least one recess formed in the first base substrate and/or in the second base substrate; the at least one recess located at an edge of the first feeding region and/or at an edge of the second feeding region, and each of the at least one recess being filled with a conductive structure.

In some embodiments, the phase shifter further includes a first waveguide structure located in the first feeding region; the at least one recess includes a first recess located in the first feeding region; and an orthographic projection of the first feeding structure on the first base substrate at least partially overlaps with an orthographic projection of a first port of the first waveguide structure on the first base substrate; and the first port of the first waveguide structure is connected to a surface of the first base substrate away from the dielectric layer, the first recess is formed in the first base substrate, and a sidewall of the first waveguide structure covers an opening of the first recess; or the first port of the first waveguide structure is connected to a surface of the second base substrate away from the dielectric layer, the first recess is formed in the second base substrate, and a sidewall of the first waveguide structure covers an opening of the first recess.

In some embodiment, the phase shifter further includes a second waveguide structure located in the second feeding region, the at least one recess further includes a second recess located in the second feeding region; an orthographic projection of the second feeding structure on the first base substrate at least partially overlaps with an orthographic projection of a first port of the second waveguide structure on the first base substrate; the first port of the second waveguide structure is connected to the surface of the first base substrate away from the dielectric layer, the second recess is formed in the first base substrate, and a sidewall of the second waveguide structure covers an opening of the second recess; or the first port of the second waveguide structure is connected to the surface of the second base substrate away from the dielectric layer, the second recess is formed in the second base substrate, and a sidewall of the second waveguide structure covers an opening of the second recess.

In some embodiments, the orthographic projection of the first feeding structure on the first base substrate is within the orthographic projection of the first port of the first waveguide structure on the first base substrate; and/or the orthographic projection of the second feeding structure on the first base substrate is within in the orthographic projection of the first port of the second waveguide structure on the first base substrate.

In some embodiments, the first waveguide structure is provided on the side of the first base substrate away from the dielectric layer, and the second waveguide structure is provided on the side of the second base substrate away from the dielectric layer; or both the first waveguide structure and the second waveguide structure are provided on the side of the second base substrate away from the dielectric layer, and the orthographic projection of the first waveguide structure on the second base substrate does not overlap with the orthographic projection of the second waveguide structure on the second base substrate.

In some embodiments, the phase shifter further includes a first reflection structure and a second reflection structure; the first reflection structure is provided on a side of the first feeding structure away from the first waveguide structure, an orthographic projection of the first reflection structure on the first base substrate at least partially overlaps with the orthographic projection of the first port of the first waveguide structure on the first base substrate and at least partially overlaps with the orthographic projection of the first feeding structure on the first base substrate, and the first reflection structure is configured to reflect a microwave signal radiated by the first feeding structure towards a side deviating from the first waveguide structure, back into the first waveguide structure; and the second reflection structure is provided on a side of the second feeding structure away from the second waveguide structure, an orthographic projection of the second reflection structure on the second base substrate at least partially overlaps with the orthographic projection of the first port of the second waveguide structure on the second base substrate and at least partially overlaps with the orthographic projection of the second feeding structure on the second base substrate, and the second reflection structure is configured to reflect a microwave signal, radiated by the second feeding structure towards a side deviating from the second waveguide structure, back into the second waveguide structure.

In some embodiments, the first reflection structure is a waveguide structure, and an orthographic projection of a first port of the first reflection structure on the first base substrate at least partially overlaps with the orthographic projection of the first port of the first waveguide structure on the first base substrate; and the second reflection structure is a waveguide structure, and an orthographic projection of a first port of the second reflection structure on the second base substrate at least partially overlaps with the orthographic projection of the first port of the second waveguide structure on the second base substrate.

In some embodiments, the at least one recess further includes a third recess in the first feeding region; the first port of the first reflection structure is connected to the surface of the first base substrate away from the dielectric layer, the third recess is formed in the first base substrate, and a sidewall of the first reflection structure covers an opening of the third recess; or the first port of the first reflection structure is connected to the surface of the second base substrate away from the dielectric layer, the third recess is formed in the second base substrate, and a sidewall of the first reflection structure covers an opening of the third recess.

In some embodiments, the at least one recess further includes a fourth recess in the second feeding region; the first port of the second reflection structure is connected to the surface of the first base substrate away from the dielectric layer, the fourth recess is formed in the first base substrate, and a sidewall of the second reflection structure covers an opening of the fourth recess; or the first port of the second reflection structure is connected to the surface of the second base substrate away from the dielectric layer, the fourth recess is formed in the second base substrate, and a sidewall of the second reflection structure covers an opening of the fourth recess.

In some embodiments, the at least one recess is located in the first feeding region and formed in the first base substrate, and the at least one recess includes a plurality of recesses arranged in a ring; the at least one recess is located in the first feeding region and formed in the second base substrate, and the at least one recess includes a plurality of recesses arranged in a ring; the at least one recess is located in the second feeding region and formed in the first base substrate, and the at least one recess includes a plurality of recesses arranged in a ring; or the at least one recess is located in the second feeding region and formed in the second base substrate, and the at least one recess includes a plurality of recesses arranged in a ring.

In some embodiments, the first waveguide structure has at least one first sidewall which is connected together to form a waveguide cavity of the first waveguide structure; and/or the second waveguide structure has at least one second sidewall which is connected together to form a waveguide cavity of the second waveguide structure.

In some embodiments, the phase shifter further includes a first metal layer and a second metal layer; the first metal layer is provided on a side of the first base substrate away from the dielectric layer, the first metal layer is provided with a first cavity therein, the first cavity defines the first waveguide structure, the second metal layer is provided on a side of the second base substrate away from the dielectric layer, the second metal layer is provided with a second cavity therein to define the second waveguide structure; or the phase shifter further includes a second metal layer provided on a side of the second base substrate away from the dielectric layer; the second metal layer is provided with a first cavity and a second cavity, the first cavity defines the first waveguide structure, the second cavity defines the second waveguide structure; and an orthographic projection of the first cavity on the second base substrate does not overlap with an orthographic projection of the second cavity on the second base substrate.

In some embodiments, the phase shifter further includes a third substrate connected to a second port of the first waveguide structure; the third substrate includes a third base substrate and a feeding transmission line provided on a side of the third base substrate close to the first waveguide structure; and a first end of the feeding transmission line is connected to an external signal line, and a second end of the feeding transmission line extends into the second port of the first waveguide structure so as to feed a signal into the first waveguide structure.

In some embodiments, an orthographic projection of the signal line on the first base substrate does not overlap with the orthographic projection of the first port of the first waveguide structure on the first base substrate and an orthographic projection of the first port of the second waveguide structure on the first base substrate.

In some embodiments, the first feeding structure is a monopole electrode provided in a same layer as the signal line and made of a same material as the signal line; and/or the second feeding structure is a monopole electrode provided in a same layer as the signal line and made of a same material as the signal line.

In some embodiments, the signal line has at least one bending corner, the reference electrode has at least one bending corner, and the at least one bending corner of the reference electrode is provided in one-to-one correspondence with the at least one bending corner of the signal line.

In some embodiments, the reference electrode includes a first sub-reference electrode and a second sub-reference electrode; the signal line is provided between the first sub-reference electrode and the second sub-reference electrode; and an orthographic projection of each of the at least one patch electrode on the first base substrate at least partially overlaps with orthographic projections of the first sub-reference electrode and second sub-reference electrode of the reference electrode on the first base substrate.

In some embodiments, the first waveguide structure and/or the second waveguide structure has a filling medium therein, and the filling medium includes polytetrafluoroethylene.

In a second aspect, an embodiment of the present disclosure provides an antenna, including at least one phase shifter, each of which is the phase shifter as mentioned above.

In some embodiments, the phase shifter further includes a second waveguide structure provided corresponding to the second feeding structure; and the antenna further includes at least one radiation unit, one of which is provided corresponding to the second port of the second waveguide structure of one of the at least one phase shifter.

In some embodiments, each of the at least one radiation unit is a third waveguide structure including a first port close to the second waveguide structure and a second port away from the second waveguide structure, the first port of the third waveguide structure is connected to the second port of the corresponding second waveguide structure; and a size of an opening of the second port of the third waveguide structure is larger than a size of an opening of the first port of the third waveguide structure, and a size of an opening of the third waveguide structure at a position relatively away from the second waveguide structure is not smaller than a size of an opening of the third waveguide structure at a position relatively close to the second waveguide structure.

In some embodiments, the second waveguide structure includes four second sidewalls which are connected together to define a waveguide cavity of the second waveguide structure; the third waveguide structure includes one third sidewall, and the third sidewall surrounds to form a waveguide cavity of the third waveguide structure; and along a direction from the waveguide cavity of the second waveguide structure towards the waveguide cavity of the third waveguide structure, a shape of the waveguide cavity of the second waveguide structure gradually transitions to a shape of the first port of the waveguide cavity of the third waveguide structure.

In some embodiments, the radiation unit includes a radiation patch; the antenna further includes a fourth substrate, the second port of the second waveguide structure of each of the at least one phase shifter is connected to the fourth substrate, and the radiation patch is provided on a side of the fourth substrate away from the second waveguide structure; and an orthographic projection of the radiation patch on the fourth substrate at least partially overlaps with an orthographic projection of the second port of the second waveguide structure corresponding to the radiation patch on the fourth substrate.

In some embodiments, the phase shifter further includes a first waveguide structure provided corresponding to the first feeding structure; the antenna includes a plurality of radiation units and a plurality of phase shifters, and one of the plurality of radiation units is provided corresponding to the second port of the second waveguide structure of one of the plurality of phase shifters; and first waveguide structures of the plurality of phase shifters are connected to form a waveguide power division network, the waveguide power division network has a main port and a plurality of sub-ports, the main port of the waveguide power division network is connected to an external signal line, and the first port of each of the first waveguide structures serves as one sub-port of the waveguide power division network.

DETAILED DESCRIPTION

Figure 1:
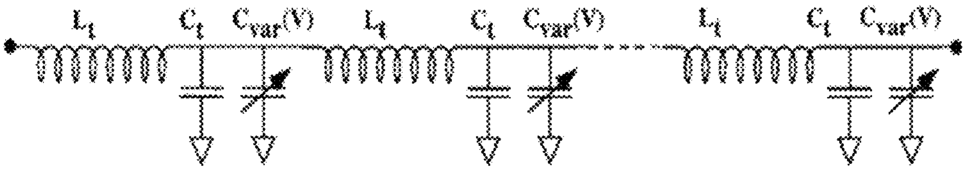
FIG. 1 is an equivalent model of a transmission line periodically loaded with variable capacitors in parallel.

In order to make the objects, technical solutions and advantages of the present invention more apparent, the present invention will be described in further detail with reference to the accompanying drawings. Obviously, the described embodiments are only a part of the embodiments of the present invention, not all embodiments. Based on the embodiments of the present invention, all other embodiments, obtained by those skilled in the art without any creative work, are within the protection scope of the present invention.

The shapes and sizes of the components in the drawings do not reflect the true proportion, but only for the purpose of facilitating the understanding of the contents of the embodiments of the present invention.

Unless otherwise defined, technical or scientific terms used herein shall have the ordinary meaning as understood by those skilled in the art. The terms “first”, “second”, and the like, as used in the present disclosure, do not denote any order, quantity, or importance, but rather are used to distinguish between different components. Similarly, similar words such as “the one”, “one” or “said” do not mean a quantitative limit, but the existence of at least one. The word “comprise”, “include”, or the like, means that the element or item preceding the word includes the element or item listed after the word and its equivalent, but does not exclude other elements or items. The term “connected”, “coupled” or the like is not restricted to a physical or mechanical connection, but may include an electrical connection, whether direct or indirect. The terms “up”, “down”, “left”, “right” and the like are used only to indicate relative positional relationships, and when the absolute position of the object being described is changed, the relative positional relationship may also be changed accordingly.

The disclosed embodiments are not limited to the embodiments shown in the drawings, but include modifications of configurations formed based on a manufacturing process. Thus, the regions illustrated in the drawings have schematic properties, and the shapes of the regions shown in the drawings illustrate specific shapes of regions of elements, but are not intended to be limiting.

It should be noted that, in a case where a transmission line in a phase shifter is periodically loaded with variable capacitors in parallel, a phase change of a microwave signal through the phase shifter may be obtained by changing capacitances of the variable capacitors, and an equivalent model of the phase shifter is shown in FIG. 1. Lt and Ct are equivalent line inductors and line capacitors of the transmission line in the phase shifter respectively, and depend on the characteristics of the transmission line and a substrate. Variable capacitors Cvar(V) each may be a Micro-Electro-Mechanical System (MEMS) capacitor, a variable-capacitance diode and the like.

Figure 2A:
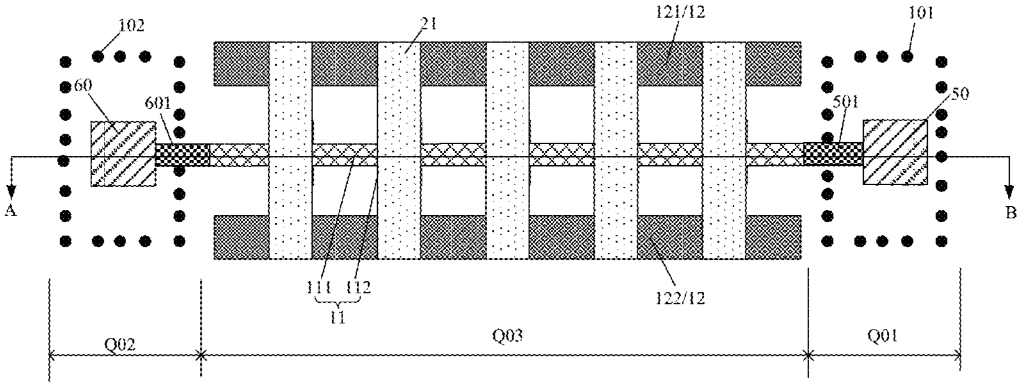
FIG. 2*a* is a top view of a phase shifter according to an embodiment of the present disclosure.
Figure 2B:
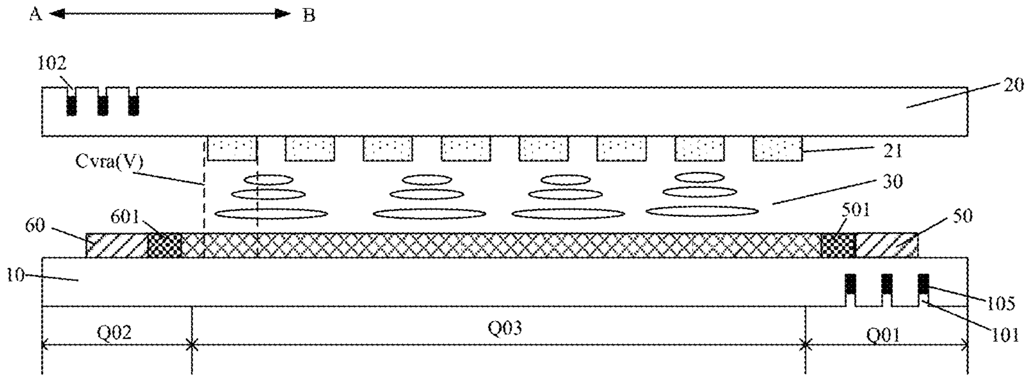
FIG. 2*b* is a cross-sectional view of the phase shifter along an A-B line in FIG. 2*a*.

In a first aspect, referring to FIG. 2*a* and FIG. 2*b*, an embodiment of the present disclosure provides a phase shifter. FIG. 2*a* is a top view of a phase shifter omitting a first base substrate 10 and a second base substrate 20, and FIG. 2*b* is a cross-sectional view taken along an A-B line of the phase shifter shown in FIG. 2*a*. The phase shifter includes a first substrate and a second substrate opposite to each other, and a dielectric layer 30 formed between the first and second substrates.

A phase shifter adopting a coplanar waveguide (CPW) transmission line is taken as an example. The phase shifter includes a first feeding region Q01, a second feeding region Q02, and a phase-shift region Q03. The first substrate includes a first base substrate 10, and a reference electrode 12 and a signal line 11 on a side of the first base substrate 10 close to the dielectric layer 30. The signal line 11 and the reference electrode 12 are located in the phase-shift region Q03, and the signal line 11 and the reference electrode 12 form a CPW transmission line. The signal line 11 may include a main structure 111 extending in a same direction as the reference electrode 12, and a plurality of branch structures 112 connected to the main structure 111 and spaced apart from each other. At least one branch structure 112 is provided along an extending direction of the main structure 111.

Figure 4:
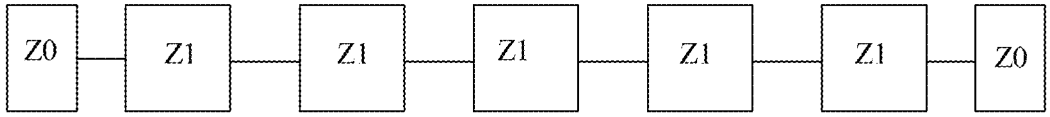
FIG. 4 is a diagram illustrating a change in impedance of the phase shifter in FIG. 2*g*.

The second substrate includes a second base substrate 20, and at least one patch electrode 21 on a side of the second base substrate 20 close to the dielectric layer 30. The patch electrode 21 is located in the phase-shift region, and an extending direction of the patch electrode 21 is the same as an extending direction of the branch structure 112 of the signal line 11. Moreover, patch electrodes 21 are provided in one-to-one correspondence with the branch structures 112, and an orthographic projection of each of the patch electrodes 21 on the first base substrate 10 at least partially overlaps with an orthographic projection of a corresponding branch structure 112 on the first base substrate 10. Moreover, in some examples, an orthographic projection of each of the patch electrodes 21 on the first base substrate 10 at least partially overlaps with an orthographic projection of the reference electrode 12 on the first base substrate 10. The patch electrodes 21 are provided in one-to-one correspondence with the branch structures 112, that is, one patch electrode 21 is provided over one branch structure 112. The patch electrode 21 overlaps with the branch structure 112 to form a variable capacitor Cvra(V). At least one variable capacitor Cvra(V) is perpendicular to the transmission direction of the electromagnetic wave, thereby forming a parallel capacitor. The phase shifter has an equivalent circuit model as shown in FIG. 1. Since the patch electrode 21 overlaps with the branch structure 112 in a certain extent, when a microwave signal is input to the main structure 111, a certain voltage difference exists between the patch electrode 21 applied a voltage and the branch structure 112. The dielectric constant of the dielectric layer 30 in the variable capacitor Cvra(V) formed by the overlapping of the patch electrode 21 with the signal line 11 may be changed by the voltage difference, thereby changing the capacitance value of the variable capacitor Cvra(V) and the phase of the microwave signal. In the phase shifter provided in the embodiment, the overlapping areas of the formed variable capacitors Cvra(V) are the same, so that when a same voltage is applied to the patch electrodes 21, the equivalent impedance of each of the formed variable capacitors Cvra(V) is also the same. As shown in FIG. 4, the impedance of each of the variable capacitors Cvra(V) is Z1. It should be noted herein that, Z0 represents the impedance value between two ends (signal input and signal output) of the signal line 11 and the reference electrode 12.

It should be noted that, the phase shifter may include a plurality of variable capacitors Cvra(V), or only include one variable capacitor Cvra(V). Accordingly, only one patch electrode 21 may be provided on a side of the second base substrate 20 of the phase shifter close to the dielectric layer 30, or a plurality of patch electrodes 21 may be provided on a side of the second base substrate 20 of the phase shifter close to the dielectric layer 30, which may be specifically determined according to a required phase shift angle. In the following, a case where the phase shifter includes a plurality of patch electrodes 21 and each of the patch electrodes 21 overlaps with one branch structure 112 to form a variable capacitor Cvra(V), is taken as an example. That is, a case where the phase shifter includes a plurality of variable capacitors Cvra(V) is taken as an example for illustration, but the present invention is not limit thereto.

It should be noted that, the reference electrode 12 of the phase shifter may include only one sub-reference electrode, for example, the reference electrode 12 may include only one of a first sub-reference electrode 121 and a second sub-reference electrode 122, or the reference electrode 12 of the phase shifter may alternatively include both the first sub-reference electrode 121 and the second sub-reference electrode 122. In the following description, a case where the reference electrode 12 includes the first sub-reference electrode 121 and the second sub-reference electrode 122 is taken as an example, but the present invention is not limit thereto. In a case where the reference electrode 12 includes the first sub-reference electrode 121 and the second sub-reference electrode 122, the signal line 11 is provided between the first sub-reference electrode 121 and the second sub-reference electrode 122. An orthographic projection of each of the patch electrodes 21 on the base substrate at least partially overlaps with an orthographic projection of the corresponding branch structure 112 on the base substrate, and the orthographic projection of each of the patch electrodes 21 on the base substrate at least partially overlaps with orthographic projections of the first sub-reference electrode 121 and the second sub-reference electrode 122 on the base substrate, respectively.

In the above phase shifter, the signal line 11, the first sub-reference electrode 121, and the second sub-reference electrode 122 constitute a CPW transmission line. A signal is fed into the signal line 11 from one end of the two ends of the signal line 11, and is fed out of the signal line 11 from the other end of the two ends of the signal line 11. An electric field generated by the CPW transmission line is a transverse electric field. That is, the electric field direction is directed from the signal line 11 to the first sub-reference electrode 121 or the second sub-reference electrode 122, and the microwave signal is confined between the signal line 11 and the first sub-reference electrode 121 or between the signal line 11 and the second sub-reference electrode 122. The microwave signal is required to be fed in or fed out at the two ends of the signal line 11. In some examples, micro-strip lines are adopted to be directly connected to the two ends of the signal line 11 for power feeding. A micro-strip line may include a transmission electrode (not shown in the drawings) in a same layer as the signal line 11, and a third reference electrode on a side of the first base substrate 10 opposite to the transmission electrode (not shown in the drawings). Since transmission electrodes are coupled to the two ends of the signal line 11, and the signal line 11 may be fed power through the transmission electrodes. However, the electric field formed between the transmission electrode and the third reference electrode of the micro-strip line is a longitudinal electric field. That is, the electric field direction of the longitudinal electric field is directed from the transmission electrode to the third reference electrode and is approximately perpendicular to the first base substrate 10. Therefore, the transverse electric field on the signal line 11 of the CPW transmission line cannot be directly converted into the longitudinal electric field on the micro-strip line, and thus the microwave signal cannot be well transmitted directly from the signal line 11 to the transmission electrode, resulting in a large transmission loss. In other embodiments, in order to convert the transverse electric field at the two ends of the signal line 11 into the longitudinal electric field, the third reference electrode may be connected to the reference electrode 12 of the CPW transmission line, and a via needs to be formed in the first base substrate 10. The third reference electrode and the reference electrode 12 respectively provided on the two sides of the first base substrate 10 are connected to each other through the via in the first base substrate 10, in which case on one hand the process complexity is increased, and on the other hand, if the first base substrate 10 is a glass substrate, the via cannot be formed in the glass substrate. Moreover, if a flowing medium such as liquid crystal molecules is used in the medium layer 30, the liquid crystal molecules may leak out through the via.

In order to solve the above problem, an embodiment of the present disclosure provides the following technical solutions. With continued reference to FIG. 2*a* and FIG. 2*b*, FIG. 2*b* is a cross-sectional view taken along an A-B line in FIG. 2*a*. The phase shifter provided by the embodiment of the present disclosure further includes a first feeding structure 50 located in the first feeding region Q01 and a second feeding structure 60 located in the second feeding region Q02. The first feeding structure 50 is electrically coupled to one end of the signal line 11 of the CPW transmission line, and the second feeding structure 60 is electrically coupled to the other end of the signal line 11 of the CPW transmission line. The first feeding structure 50 is configured to change a transmission direction of the microwave signal to be transmitted through the signal line 11 of the CPW transmission line, so that the microwave signal transmitted on the signal line 11 is transmitted in a first direction, and the first direction intersects with a plane in which the first base substrate 10 is located. The second feeding structure 60 is configured to change a transmission direction of the microwave signal after being transmitted through the signal line 11 of the CPW transmission line, so that the microwave signal after being transmitted through the signal line 11 is transmitted in a second direction, and the second direction intersects with the plane in which the first base substrate 10 is located. Specifically, in the phase shifter, each of the first feeding structure 50 and the second feeding structure 60 is a feeding structure having a longitudinal electric field in a direction approximately perpendicular to the first base substrate 10, that is, the electric field direction of the electric field generated by the first feeding structure 50 at least partially intersects with the plane in which the first base substrate 10 is located, and the electric field direction of the electric field generated by the second feeding structure 60 at least partially intersects with the plane in which the first base substrate 10 is located. Therefore, the first feeding structure 50 and the second feeding structure 60 respectively coupled to the two ends of the signal line 11 may convert the transverse electric fields at the two ends of the signal line 11 into the longitudinal electric fields, so that the microwave signal may be transmitted along the longitudinal electric field. A case where a microwave signal is fed into the signal line 11 through the first feeding structure 50 and is fed out the signal line 11 through the second feeding structure 60 is taken as an example. A microwave signal is coupled to the first feeding structure 50, and the microwave signal received by the first feeding structure 50 is transmitted to the signal line 11. The microwave signal is transmitted along the extending direction of the signal line 11, and is transmitted after being phase shifted to the second feeding structure 60 at the other end of the signal line 11. The second feeding structure 60 couples the microwave signal to a side of the second base substrate 20 away from the dielectric layer 30 through the longitudinal electric field. If the second base substrate 20 is provided with a radiation unit, the microwave signal may be coupled to the radiation unit through the second feeding structure 60 and then radiated out through the radiation unit. Since the first feeding structure 50 and the second feeding structure 60 are connected to the two ends of the signal line 11 respectively, the first feeding structure 50 and the second feeding structure 60 can convert the transverse electric fields into the longitudinal electric fields at the two ends of the signal line 11, thereby converting the transverse electric fields into the longitudinal electric fields at the two ends of the coplanar waveguide transmission line.

It should be noted that, the first direction and the second direction each are a direction intersecting with the plane in which the first base substrate 10 is located. That is, the transmission direction (the first direction) of the microwave signal converted by the first feeding structure 50 intersects with the plane in which the first base substrate 10 is located, and similarly, the transmission direction (the second direction) of the microwave signal converted by the electric field direction of the second feeding structure 60 intersects with the plane in which the first base substrate 10 is located. The first direction and the second direction may be any directions satisfying the above characteristics. For convenience of explanation, the following description will be given by taking the first direction as a direction perpendicular to the plane in which the first base substrate 10 is located, the second direction as a direction perpendicular to the plane in which the first base substrate 10 is located, and the first direction being the same as the second direction, as an example, but the present invention is not limited thereto.

It should be noted that, in a case where the phase shifter is applied to an antenna, the antenna may be a transmitting antenna or a receiving antenna, and the radiation unit is connected to the second feeding structure 60. If the antenna is used as a transmitting antenna, a signal fed by a feed-forward circuit may be received by the first feeding structure 50, then is input to the signal line 11, is coupled to the radiation unit by the second feeding structure 60 after being received by the second feeding structure 60, and transmitted out by the radiation unit. If the antenna is used as a receiving antenna, a signal is received by the radiation unit and then coupled to the second feeding structure 60 by the radiation unit, is received by the second feeding structure 60 and then transmitted to the signal line 11 through the second feeding structure 60, is received by the first feeding structure 50 connected to the other end of the signal line 11 and then coupled back to the feed-forward circuit through the first feeding structure 50. For convenience of explanation, the first feeding structure 50 and the second feeding structure 60 of the phase shifter are taken as an example of an input terminal and an output terminal, respectively.

In some examples, each of the first feeding structure 50 and the second feeding structure 60 may be any feeding structure capable of transmitting a microwave signal in a direction which is not parallel to the first base substrate 10. For example, the first feeding structure 50 may be a monopole electrode, and may be provided in a same layer as the signal line 11 and made of a same material as the signal line 11. The second feeding structure 60 may also be a monopole electrode, and may be provided in a same layer and made of a same material as the signal line 11. Therefore, the monopole electrodes are connected to the two ends of the signal line 11, may convert a transverse electric field generated by the signal line 11 of the CPW transmission line into a longitudinal electric field, and radiate a microwave signal in a direction perpendicular to the first base substrate 10, thereby achieving feeding in and feeding out of the microwave signal. A monopole electrode as the first and/or second feeding structures 50 and 60 may have a specific structure of any type. For example, the first and second feeding structures 50 and 60 each may be a monopole patch electrode in the same layer as the signal line 11. In some examples, the first and second feeding structures 50 and 60 may be integrally formed with the signal line 11 as a single piece, thereby simplifying the manufacturing process. In the following, the description is made by taking an example in which the first feeding structure 50 and the second feeding structure 60 each are monopole patch electrodes.

In some examples, in a case where each of the first feeding structure 50 and the second feeding structure 60 is a monopole patch electrode, a width of the first feeding structure 50 is greater than a width of the signal line 11 of the CPW transmission line, and a width of the second feeding structure 60 is also greater than the width of the signal line 11 of the CPW transmission line.

In some examples, with the above structure, for achieving smoothing transmission of a microwave signal, the branch structure 112 may be provided to penetrate through the main structure 111. In some embodiments, the branch structure 112 and the main structure 111 may be designed to be formed as a single piece. That is, as shown in FIG. 2*a*, the branch structure 112 is provided in a same layer as the main structure 111 and made of a same material as the main structure 111, thereby facilitating the preparation of the branch structure 112 and the main structure 111 and the reduction of the manufacturing cost. Of course, the branch structure 112 may be electrically coupled to the main structure 111 in any other manner, which is not limited in the embodiments of the present invention. In this case, when a microwave signal is input to the main structure 111, voltages are applied to the patch electrode 21 and the branch structure 112 to obtain a certain voltage difference therebetween, so that the dielectric constant of the dielectric layer 30 in a liquid crystal capacitor formed by overlapping the patch electrode 21 with the signal line 11 is changed due to the voltage difference, so as to change the phase of the microwave signal.

With continued reference to FIG. 2*b*, in order to reduce energy loss of the microwave signal, a recess may be formed in the first base substrate in the first feeding region Q01, a recess may be correspondingly formed in the second base substrate in the second feeding region Q02, and a conductive structure 105 may be formed in the recess of each of the first and second base substrates, so that the microwave signal is fed into the first feeding structure in the first feeding region Q01, and simultaneously fed out through the second feeding structure in the second feeding region Q02.

Figure 2C:
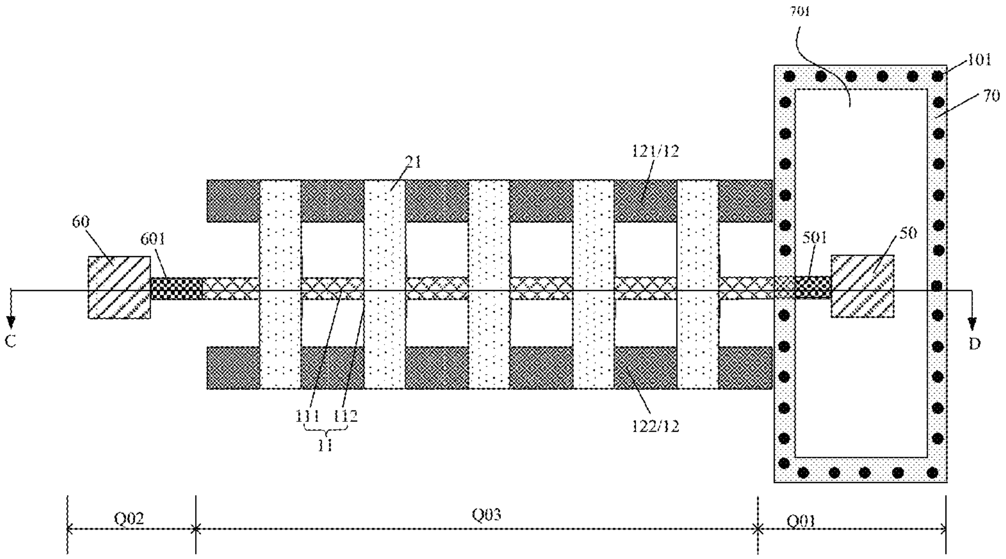
FIG. 2*c* is a top view of a phase shifter (with a first waveguide structure) according to an embodiment of the present disclosure.
Figure 2D:
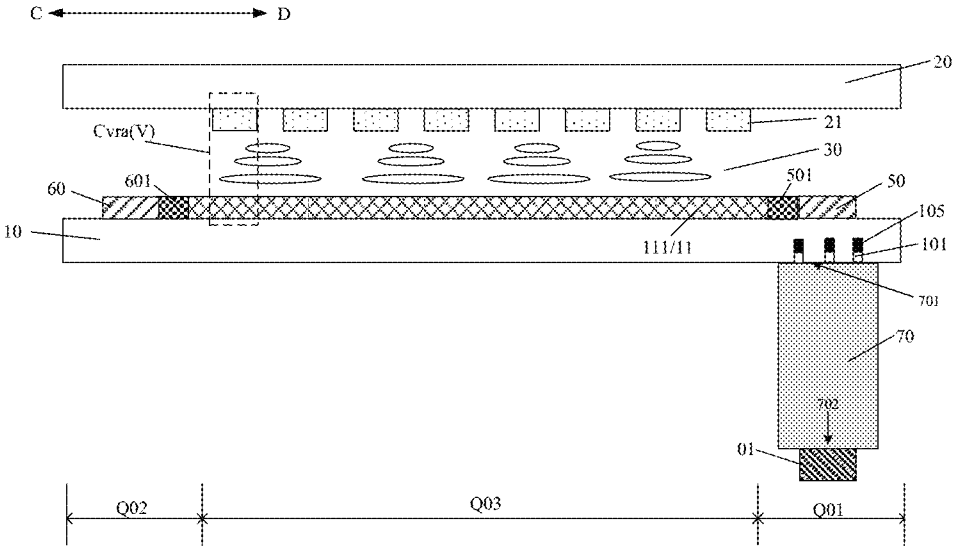
FIG. 2*d* is a cross-sectional view of the phase shifter along a C-D line in FIG. 2*c*.
Figure 2E:
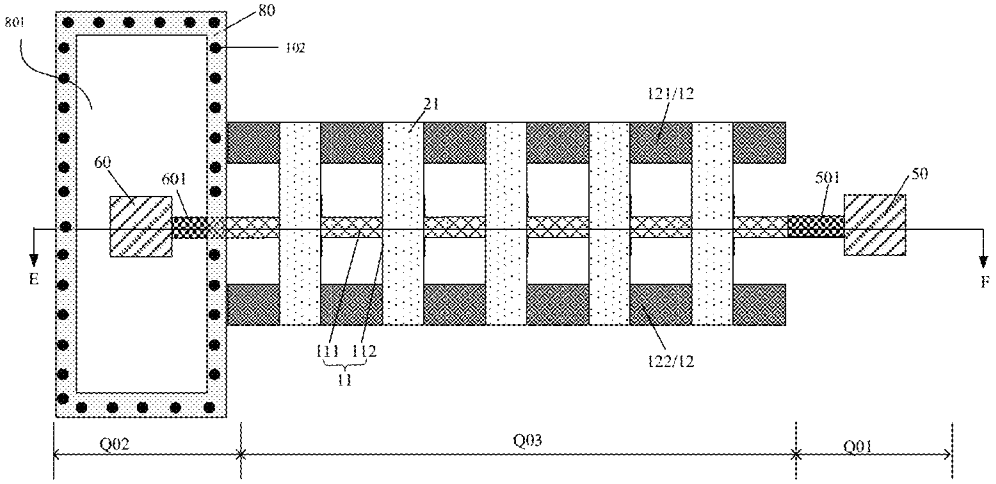
FIG. 2*e* is a top view of a phase shifter (with a second waveguide structure) according to an embodiment of the present disclosure.
Figure 2F:
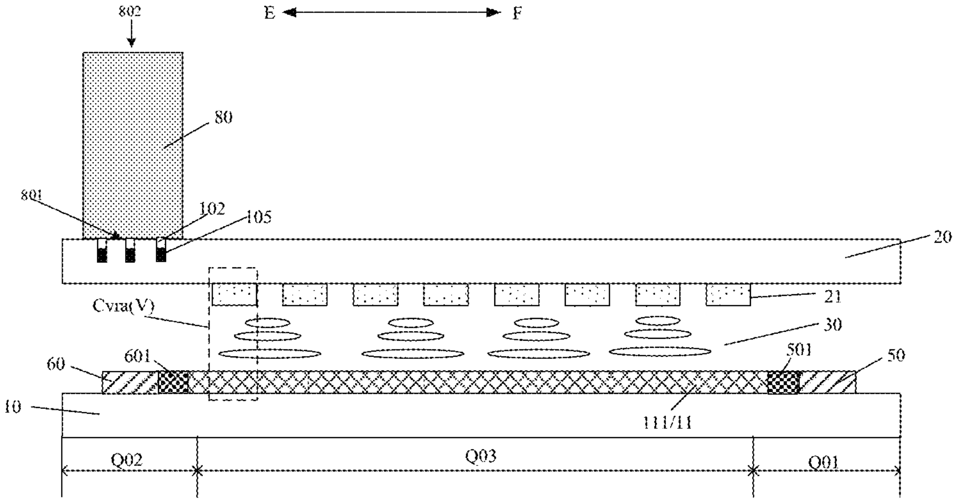
FIG. 2*f* is a cross-sectional view of the phase shifter along an E-F line in FIG. 2*e*.
Figure 2G:
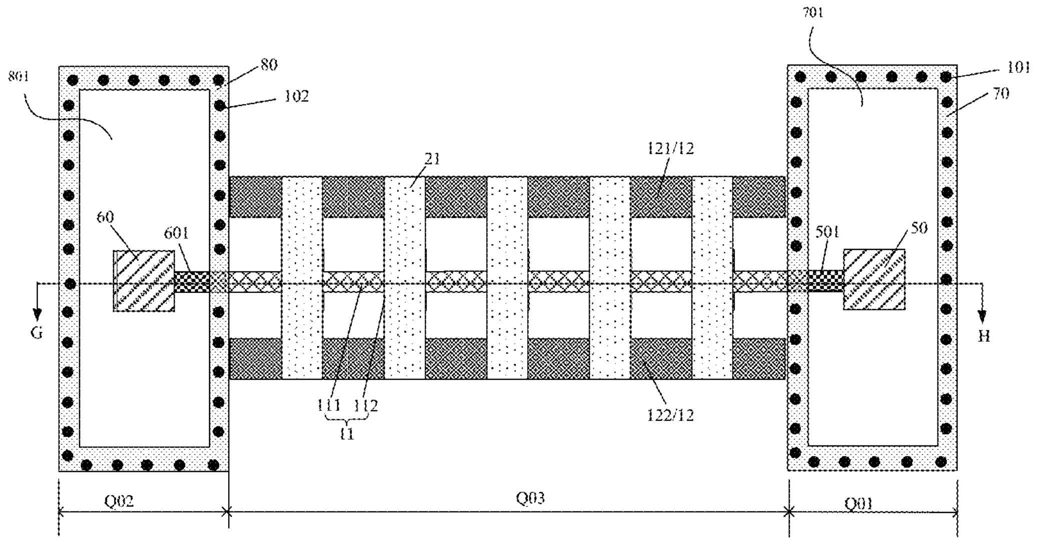
FIG. 2*g* is a top view of a phase shifter (with a first waveguide structure and a second waveguide structure) according to an embodiment of the present disclosure.
Figure 3:
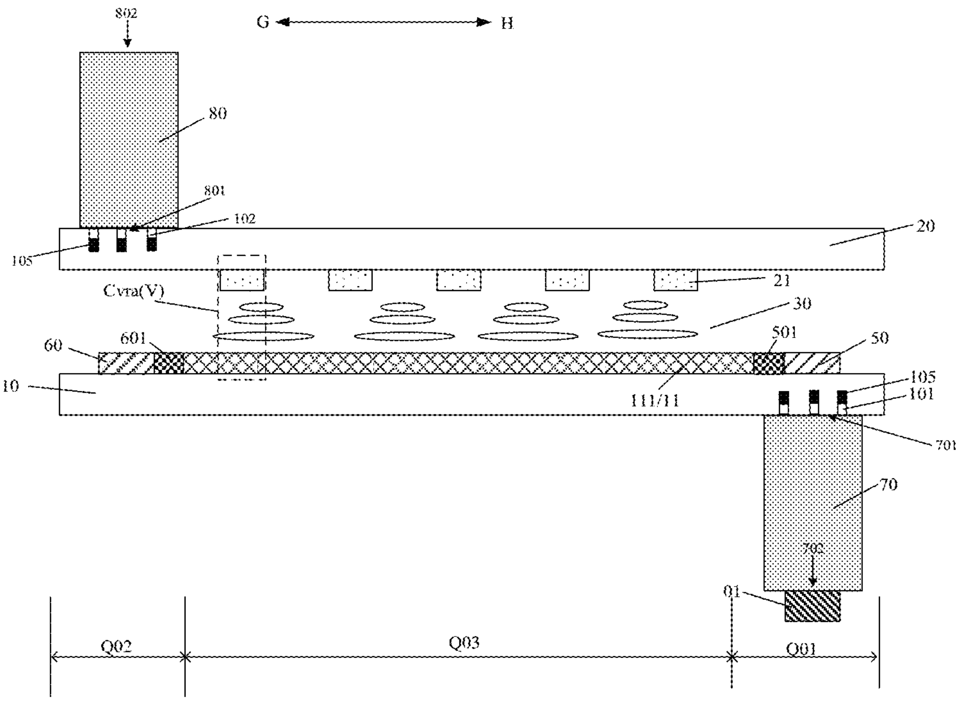
FIG. 3 is a cross-sectional view of the phase shifter along a G-H line in FIG. 2*g*.

In some examples, referring to FIGS. 2*c* to 3, a waveguide structure together with a first feeding structure 50 and/or a second feeding structure 60 may be adopted in the phase shifter provided by embodiments of the present disclosure to transmit a signal. For details, refer to the following examples.

In some examples, referring to FIGS. 2*c* to 2*d*, FIG. 2*d* is a cross-sectional view taken along a C-D line of FIG. 2*c*. The phase shifter provided by the embodiment of the present disclosure may further include a first waveguide structure 70 which has a first port 701 and a second port 702. The first waveguide structure 70 is provided corresponding to the first feeding structure 50. That is, an orthographic projection of the first feeding structure 50 on the first base substrate 10 at least partially overlaps with an orthographic projection of the first port 701 of the first waveguide structure 70 on the first base substrate 10. Specifically, the first waveguide structure 70 may be provided on a side of the first base substrate 10 away from the dielectric layer 30, or may be provided on a side of the second base substrate 20 away from the dielectric layer 30, as long as the orthographic projection of the first feeding structure 50 on the first base substrate 10 at least partially overlaps with the orthographic projection of the first port 701 of the first waveguide structure 70 on the first base substrate 10. In the embodiment, a case where the first feeding structure 50 is used as an input terminal and the second feeding structure 60 is used as an output terminal is taken as an example. A microwave signal transmitted through an external signal line is received by the second port 702 of the first waveguide structure 70, passes through the waveguide cavity of the first waveguide structure 70, and is coupled by the first port 701 of the first waveguide structure 70 to the first feeding structure 50, the orthographic projection of which overlaps with the orthographic projection of the first port 701 of the first waveguide structure 70. The microwave signal received by the first feeding structure 50 is transmitted by the first feeding structure 50 to the signal line 11, and propagates along the extending direction of the signal line 11 and is transmitted after being phase-shifted to the second feeding structure 60 at the other end of the signal line 11. The phase-shifted microwave signal is coupled out via a longitudinal electric field by the second feeding structure 6. The transmission loss of the microwave signal can be effectively reduced by transmitting the signal through the first waveguide structure 50.

With continued reference to FIGS. 2*c* to 2*d*, in this case, a recess in the first base substrate 10 is formed in the first feeding region Q01. For convenience of explanation, the recess is referred to as a first recess 101, and a conductive structure 105 is formed in the first recess 101. In some examples, the first recess 101 includes but is not limited to a structure of blind hole, and there may be a plurality of first recesses 101. The plurality of first recesses 101 are arranged in a ring, and a bottom surface of the first port 701 of the first waveguide structure 70 (i.e., a bottom surface of a side wall of the first waveguide structure 70) covers the first recesses 101, which is equivalent to extending the first waveguide structure 70 towards the first feeding structure 50, and thus, the loss of the fed microwave signal can be effectively reduced.

In some examples, referring to FIGS. 2*e* to 2*f*, FIG. 2*f* is a cross-sectional view taken along an E-F line of FIG. 2*e*. The phase shifter provided by the embodiment of the present disclosure may further include a second waveguide structure 80 which has a first port 801 and a second port 802. The second waveguide structure 80 is provided corresponding to the second feeding structure 60. That is, an orthographic projection of the second feeding structure 60 on the first base substrate 10 at least partially overlaps with an orthographic projection of the first port 801 of the second waveguide structure 80 on the first base substrate 10. Specifically, the second waveguide structure 80 may be provided on a side of the second base substrate 20 away from the dielectric layer 30, and the second port 802 of the second waveguide structure 80 may be connected to the radiation unit. In the embodiment, a case where the first feeding structure 50 is used as an input terminal and the second feeding structure 60 is used as an output terminal is taken as an example. A microwave signal transmitted through an external signal line is received by the first feeding structure 50, propagates along the extending direction of the signal line 11, and is transmitted after being phase-shifted to the second feeding structure 60 at the other end of the signal line 11. The microwave signal is coupled through a longitudinal electric field by the second feeding structure 60 to the first port 801 of the second waveguide structure 80 an orthographic projection of which overlaps with the orthographic projection of the second feeding structure 60, passes through the waveguide cavity of the second waveguide structure 80, and is coupled to the radiation unit through the second port 802 of the second waveguide structure 80. The transmission loss of the microwave signal can be effectively reduced by transmitting the signal through the second waveguide structure 80.

With continued reference to FIGS. 2*e* to 2*f*, in this case, a recess in the second base substrate 20 is formed in the second feeding region Q02. For convenience of explanation, the recess is referred to as a second recess 102, and a conductive structure 105 is formed in the second recess 102. In some examples, the second recess 102 includes but is not limited to a structure of blind hole, and there may be a plurality of the second recesses 102. The plurality of second recesses 102 are arranged in a ring, and a bottom surface of the first port 801 of the second waveguide structure 80 (i.e., a bottom surface of a side wall of the second waveguide structure 80) covers the second recesses 102, which is equivalent to extending the second waveguide structure 80 towards the second feeding structure 60, and the loss of the fed-out microwave signal can be effectively reduced.

In some examples, referring to FIGS. 2*g* to 3, FIG. 3 is a cross-sectional view taken along a line G-H of FIG. 2*g*. The phase shifter provided by the embodiment of the present disclosure may be provided with waveguide structures at both the first feeding structure 50 and the second feeding structure 60, that is, the phase shifter may further include a first waveguide structure 70 and a second waveguide structure 80. The first feeding structure 50 and the second feeding structure 60 are respectively connected to the two ends of the signal line 11. The first waveguide structure 70 has a first port 701 and a second port 702, and is provided corresponding to the first feeding structure 50, that is, an orthographic projection of the first feeding structure 50 on the first base substrate 10 at least partially overlaps with an orthographic projection of the first port 701 of the first waveguide structure 70 on the first base substrate 10. The second waveguide structure 80 has a first port 801 and a second port 802, and is provided corresponding to the second feeding structure 60, that is, an orthographic projection of the second feeding structure 60 on the first base substrate 10 at least partially overlaps with an orthographic projection of the first port 801 of the second waveguide structure 80 on the first base substrate 10.

With continued reference to FIGS. 2*g* to 3, in this case, a first recess 101 in the first base substrate 10 is formed in the first feeding region Q01, a second recess 102 in the second base substrate 20 is formed in the second feeding region Q02, a conductive structure 105 is formed in both the first recess 101 and the second recess 102, and the first recess 101 and the second recess 102 are arranged in the same manner as described above, and therefore, a description thereof will not be repeated. A bottom surface of the first port 701 of the first waveguide structure 70 (i.e., a bottom surface of a sidewall of the first waveguide structure 70) covers the first recess 101, which is equivalent to extending the first waveguide structure 70 toward the first feeding structure 50, so that the loss of the fed-in microwave signal can be effectively reduced. A bottom surface of the first port 801 of the second waveguide structure 80 (i.e., a bottom surface of a sidewall of the second waveguide structure 80) covers the second recess 102, which is equivalent to extending the second waveguide structure 80 toward the second feeding structure 60, so that the loss of the fed-out microwave signal can be effectively reduced.

In the phase shifter, the first feeding structure 50 and the second feeding structure 60 each are a feeding structure having a longitudinal electric field in a direction approximately perpendicular to the first base substrate 10. Therefore, the first feeding structure 50 and the second feeding structure 60 are connected to the two ends of the signal line 11, respectively, and may convert a transverse electric field at both ends of the signal line 11 into a longitudinal electric field. A case where a microwave signal is fed in through the first feeding structure 50 and fed out through the second feeding structure 60 is taken as an example. A microwave signal is fed into the waveguide cavity of the first waveguide structure 70 through the second port 702 of the first waveguide structure 70, and is then coupled to the first feeding structure 50 by the first recess 101 through the first port 701 of the first waveguide structure 70. The microwave signal received by the first feeding structure 50 is transmitted to the signal line 11. The microwave signal propagates along the extending direction of the signal line 11, and is transmitted to the second feeding structure 60 at the other end of the signal line 11 after being phase-shifted. The phase-shifted microwave signal is coupled to the first port 801 of the second waveguide structure 80 through the second recess 102 by a longitudinal electric field in the second feeding structure 60, and is then fed out through the second port 802 of the second waveguide structure 80. Since the first feeding structure 50 and the second feeding structure 60 are connected to the two ends of the signal line 11 respectively, the first feeding structure 50 and the second feeding structure 60 can convert the transverse electric field at the two ends of the signal line 11 into the longitudinal electric field, thereby achieving the conversion from the transverse electric field at the two ends of the coplanar waveguide transmission line to the longitudinal electric field. Moreover, the first waveguide structure 70, the first recess 101, the second waveguide structure 80 and the second recess 102 are adopted to transmit microwave signals, so that the transmission loss of the microwave signals can be effectively reduced.

It should be noted that, in the phase shifter provided in the embodiment of the present disclosure, the phase shifter may be provided with only the first waveguide structure 70, or only the second waveguide structure 80, or both the first waveguide structure 70 and the second waveguide structure 80, which is not limited herein. In the following, both the first waveguide structure 70 and the second waveguide structure 80 are provided in the phase shifter as an example.

In the phase shifter provided in the embodiments of the present disclosure, a tunable dielectric of any type may be used for the dielectric layer 30. For example, the dielectric layer 30 may include a tunable dielectric, such as liquid crystal molecules or ferroelectrics, and the following description will take the example where the dielectric layer 30 includes liquid crystal molecules. By applying voltages to the patch electrodes 21 and the CPW transmission line, the deflection angle of the liquid crystal molecules may be changed, so that the dielectric constant of the liquid crystal layer 30 is changed to achieve the phase shift of the microwave signals.

In some examples, the liquid crystal molecules in the dielectric layer 30 are positive liquid crystal molecules or negative liquid crystal molecules. It should be noted that, in a case where the liquid crystal molecules are positive liquid crystal molecules, in the embodiment of the present disclosure, an included angle between a long axis direction of the liquid crystal molecules and the patch electrode 21 is greater than 0 degree and less than or equal to 45 degrees. In a case where the liquid crystal molecules are negative liquid crystal molecules, in the embodiment of the present disclosure, an included angle between a long axis direction of the liquid crystal molecules and the patch electrode 21 is larger than 45 degrees and smaller than 90 degrees. In this case, the dielectric constant of the dielectric layer 30 is ensured to be changed after the liquid crystal molecules are deflected, thereby achieving the phase shift of the microwave signals.

In some examples, the phase shifter of the present embodiment further includes a signal connector 01, one end of the signal connector 01 is connected to an external signal line, and the other end of the signal connector 01 is connected to the second port 702 of the first waveguide structure 70. A microwave signal is input into the first waveguide structure 70 through the signal connector 01, and is coupled to the first feeding structure 50 through the first waveguide structure 70. The signal connector 01 may be of any type, such as an SMA connector, and the like, which is not limited thereto.

It should be noted that, in the phase shifter provided in the embodiment of the present disclosure, the microwave signal may be a high frequency signal, and the control signal for periodically loading the capacitors connected in parallel may be a low frequency signal, so that the microwave signal is different from the control signal for loading the capacitors. The microwave signal is input to the signal line 11 through the first feeding structure 50 or the second feeding structure 60, and the control signal for loading the capacitors is input to the patch electrode 21 and the signal line 11 through a signal line.

In some examples, the phase shifter provided by the embodiment of the present disclosure may further include a first signal line and a second signal line (neither of which is shown in the drawings). A control signal for the capacitors in parallel is periodically applied to the patch electrode 21 through the first signal line, and the first signal line is electrically coupled to the patch electrode 21. A control signal for the capacitors in parallel is periodically applied to the signal line 11 through the second signal line, and the second signal line is electrically coupled to the signal line 11.

In addition, it should be noted that, the phase shifter may include a plurality of phase adjusting units, and corresponding one or more patch electrodes 21 are provided in each of the plurality of phase adjusting units. An electric field is formed after each phase adjusting unit and the signal line 11 of the CPW transmission line are applied with voltages, and the liquid crystal molecules in the dielectric layer 30 are driven to deflect by the electric field, thereby changing the dielectric constant of the dielectric layer 30. Thus, the phase of the microwave signal may be changed. After the patch electrode 21 and the signal line 11 are applied with voltages, in different phase adjusting units, the microwave signal is correspondingly adjusted to have different phase shifts. That is, in each phase adjusting unit, the microwave signal may be correspondingly adjusted to have one phase shift. Therefore, when the phase shift of the microwave signal is required to be adjusted, the corresponding phase adjusting unit is controlled to be applied with voltages according to the phase shift to be adjusted, and it is not required to apply voltages to all the phase adjusting units, so that the phase shifter in the embodiment is convenient to be controlled and has low power consumption.

In addition, for facilitating control and simplifying wiring, the patch electrodes 21 in all the phase adjusting units may be controlled through a same first signal line. Of course, the patch electrodes 21 in different phase adjusting units may be controlled through different first signal lines according to actual requirements, which is not limited herein.

In some examples, referring to FIG. 2*g*, to ensure better transmission of a microwave signal by the first feeding structure 50 and the first waveguide structure 70, an orthographic projection of the first feeding structure 50 on the first base substrate 10 is within an orthographic projection of the first port 701 of the first waveguide structure 70 on the first base substrate 10. Similarly, in order to ensure better transmission of a microwave signal by the second feeding structure 60 and the second waveguide structure 80, an orthographic projection of the second feeding structure 60 on the first base substrate 10 is within an orthographic projection of the first port 801 of the second waveguide structure 80 on the first base substrate 10.

Further, in order to ensure better transmission efficiency between the first feeding structure 50 and the first waveguide structure 70, the first feeding structure 50 and the first waveguide structure 70 may be provided opposite to each other. The first feeding structure 50 may be symmetric with respect to its center in shape (i.e., the first feeding structure 50 may be a center-symmetric pattern), and the first port 701 of the first waveguide structure 70 may be symmetric with respect to its center in shape (i.e., the first port 701 of the first waveguide structure 70 may be a center-symmetric pattern). A distance between an orthographic projection of a symmetric center of the first feeding structure 50 on the first base substrate 10 and an orthographic projection of a symmetric center of the first port 701 of the first waveguide structure 70 on the first base substrate 10 is not greater than a first preset value. The first preset value should be as small as possible, for example, smaller than 0.1 cm. If the first preset value is 0, the first feeding structure 50 and the first waveguide structure 70 are provided directly opposite to each other, and the symmetric center of the first feeding structure 50 coincides with the symmetric center of the first port 701 of the first waveguide structure 70. Similarly, in order to ensure better transmission efficiency of the second feeding structure 60 and the second waveguide structure 80, the second feeding structure 60 and the second waveguide structure 80 may be provided opposite to each other. The second feeding structure 60 may be symmetric with respect to its center in shape (i.e., the second feeding structure 60 may be a center-symmetric pattern), and the first port 801 of the second waveguide structure 80 may be symmetric with respect to its center in shape (i.e., the first port 801 of the second waveguide structure 80 may be a center-symmetric pattern). A distance between an orthographic projection of the symmetric center of the second feeding structure 60 on the first base substrate 10 and an orthographic projection of the symmetric center of the first port 801 of the second waveguide structure 80 on the first base substrate 10 is not greater than a second preset value. The second preset value should be as small as possible, for example, less than 0.1 cm. If the second preset value is 0, the second feeding structure 60 and the second waveguide structure 80 are provided directly opposite to each other, and the symmetric center of the second feeding structure 60 coincides with the symmetric center of the second waveguide structure 80.

Figure 5:
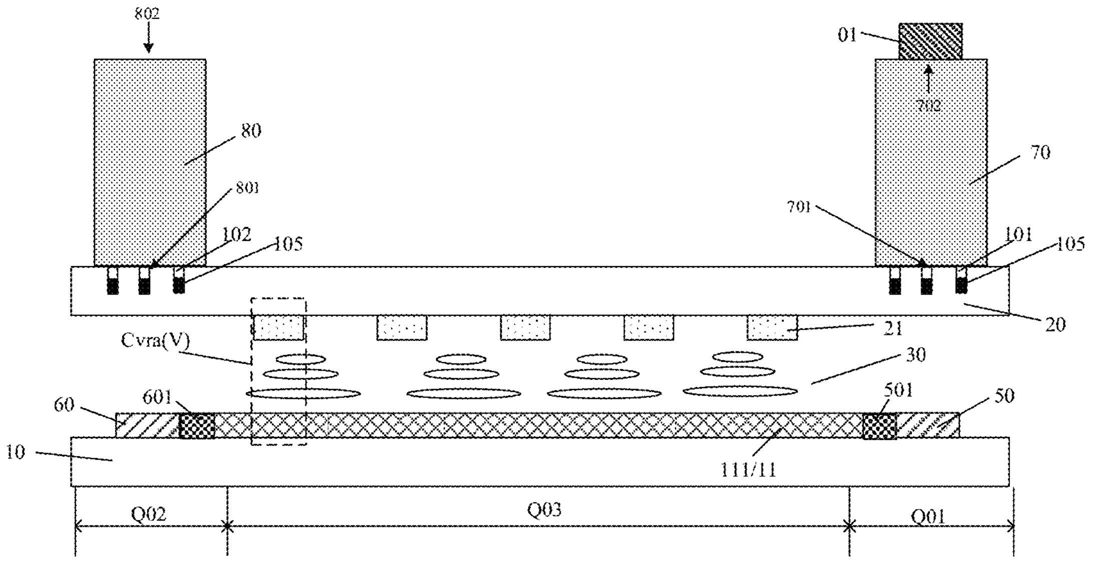
FIG. 5 is a side view of a phase shifter according to an embodiment of the present disclosure.

In some examples, referring to FIG. 3 and FIG. 5, the first waveguide structure 70 is provided corresponding to the first feeding structure 50, and the second waveguide structure 80 is provided corresponding to the second feeding structure 60. Specifically, as shown in FIG. 3, the first waveguide structure 70 may be provided on a side opposite to the side on which the second waveguide structure 80 is provided. That is, the first waveguide structure 70 is provided on a side of the first base substrate 10 away from the dielectric layer 30, and the second waveguide structure 80 is provided on a side of the second base substrate 20 away from the dielectric layer. It is understood that, as shown in FIG. 5, the first waveguide structure 70 may be provided on the same side as the second waveguide structure 80, for example, both the first waveguide structure 70 and the second waveguide structure 80 are provided on a side of the second base substrate 20 away from the dielectric layer 30. In this case, an orthographic projection of the first waveguide structure 70 on the second base substrate 20 does not overlap with an orthographic projection of the second waveguide structure 80 on the second base substrate 20, so as to ensure that the structures of the first waveguide structure 70 and the second waveguide structure 80 are independent from each other and do not affect each other. In this case, both the first and second recesses 101 and 102 are provided in the second base substrate. The principle of providing the first and second recesses 101 and 102 is the same as that described above, and therefore, a description thereof will not be repeated here.

Figure 6:
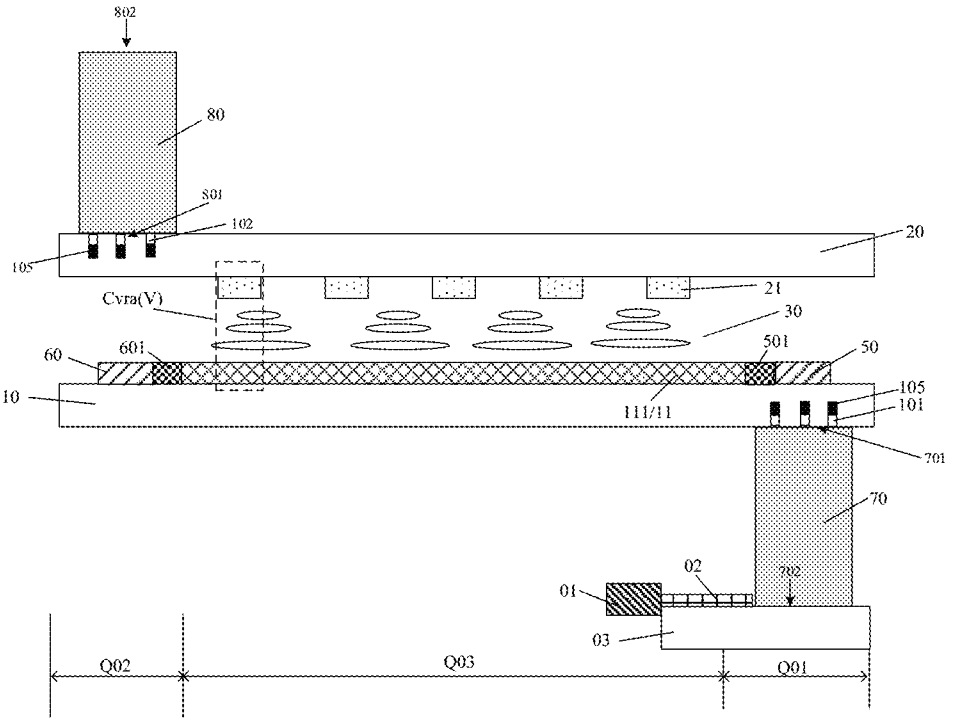
FIG. 6 is a side view of a phase shifter according to an embodiment of the present disclosure.
Figure 7:
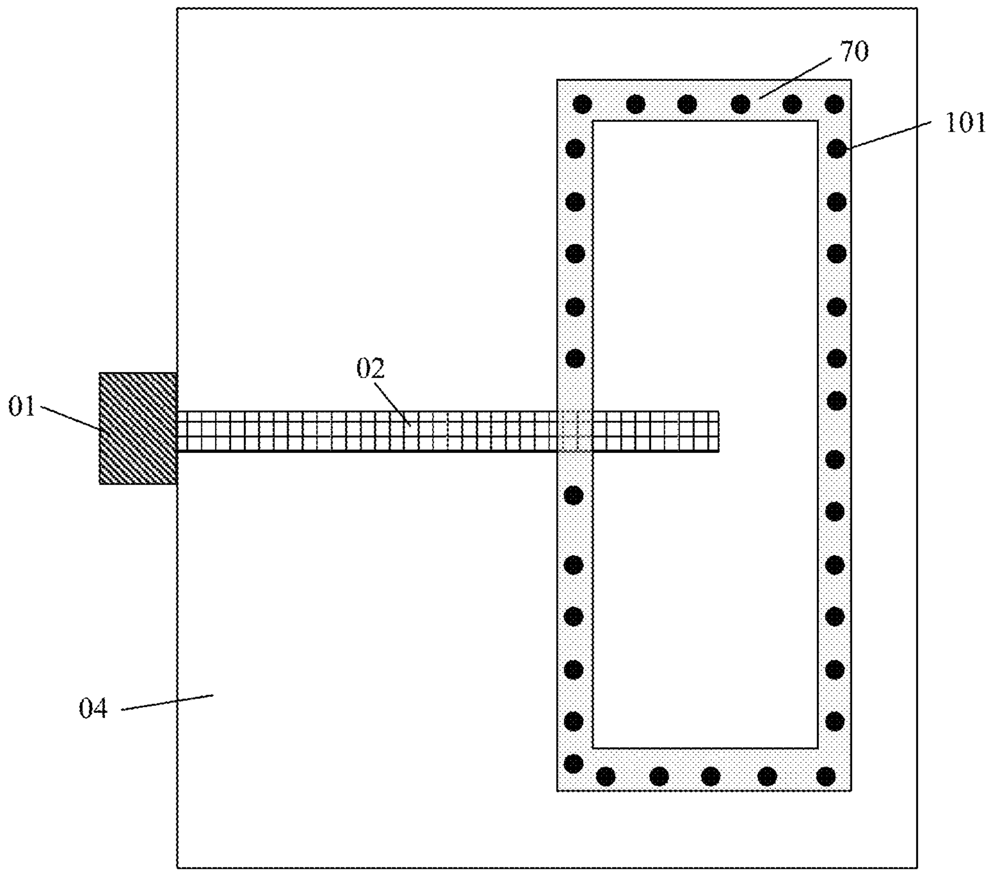
FIG. 7 is a top view of a part of the phase shifter at a third substrate of FIG. 6.

In some examples, referring to FIG. 6 and FIG. 7, the phase shifter may further include a third substrate connected to the second port 702 of the first waveguide structure 70. The third substrate includes a third base substrate 03 and a feeding transmission line 02. The third base substrate 03 is connected to the second port 702 of the first waveguide structure 70, and the feeding transmission line 02 is provided on a side of the third base substrate 03 close to the first waveguide structure 70. Referring to FIG. 7, a first end of the feeding transmission line 02 extends to an edge of the third base substrate 03 to be connected to an external signal line. Specifically, the signal connector 01 may be provided on the edge of the third base substrate 03, one end of the signal connector 01 is connected to the feeding transmission line 02, and the other end of the signal connector 01 is connected to the external signal line, thereby inputting a signal to the feeding transmission line 02. A second end of the feeding transmission line 02 extends to the second port 702 of the first waveguide structure 70 to feed the signal into the waveguide cavity of the first waveguide structure 70. The signal is then coupled to the first feeding structure 50 through the first port 701 of the first waveguide structure 70. Specifically, the second end of the feeding transmission line 02 may extend into the second port 702 of the first waveguide structure 70. That is, an orthographic projection of the second end of the feeding transmission line 02 on the first base substrate 10 is within an orthographic projection of the second port 702 of the first waveguide structure 70 on the first base substrate 10.

In some examples, referring to FIG. 2, the CPW transmission line may not enter the waveguide cavity of the first waveguide structure 70 and/or the waveguide cavity of the second waveguide structure 80, or may extend at least partially into the waveguide cavity of the first waveguide structure 70 and/or the waveguide cavity of the second waveguide structure 80. In a case where the CPW transmission line does not enter the waveguide cavity of the first waveguide structure 70 and/or the waveguide cavity of the second waveguide structure 80, the orthographic projection of the signal line 11 of the CPW transmission line on the first base substrate 10 does not overlap with the orthographic projections of the first port 701 of the first waveguide structure 70 and the first port 801 of the second waveguide structure 80 on the first base substrate 10. Similarly, the orthographic projections of the first sub-reference electrode 121 and the second sub-reference electrode 122 on the first base substrate 10 each do not overlap with the orthographic projections of the first port 701 of the first waveguide structure 70 and the first port 801 of the second waveguide structure 80 on the first base substrate 10.

In some examples, the phase shifter may further include a first connection structure 501 and a second connection structure 601 provided on a side of the first base substrate 10 close to the dielectric layer 30. The first connection structure 501 is connected between the first feeding structure 50 and the first end of the main structure 111 of the signal line 11, and the second connection structure 601 is connected between the second feeding structure 60 and the second end of the main structure 111 of the signal line 11. The first connection structure 501 and the second connection structure 601 each may be used as an impedance matching structure. At an interface between the first feeding structure 50 and the signal line 11 as an input terminal for the microwave signal, if the impedance of the first feeding structure 50 is different from that of the signal line 11, a standing wave ratio (of standing waves) is not equal to 1, that is, there is a return loss, which degrades the performance of the phase shifter, and therefore the impedance matching needs to be considered. With the first connection structure 501, the impedance matching is achieved between the first feeding structure 50 and the signal line 11. Similarly, at an interface between the second feeding structure 60 and the signal line 11 of the CPW transmission line as a loading terminal (e.g., the radiation unit), if the impedance of the second feeding structure 60 is different from that of the signal line 11 of the CPW transmission line, the standing wave ratio (of the standing waves) is not 1, that is, there is a return loss, which degrades the performance of the phase shifter, and therefore the impedance matching needs to be considered. With the second connection structure 601, the impedance matching is achieved between the second feeding structure 60 and the signal line 11.

In some examples, if the impedances of the first feeding structure 50, the second feeding structure 60, and the signal line 11 are the same, for example, all are equal to 100Ω, the impedance matching is not required, the first connection structure 501 and the second connection structure 601 each may be a connection line, the first connection structure 501 may have a same width as the main structure 111 of the signal line 11, and the second connection structure 601 may have a same width as the main structure 111 of the signal line 11. In the present embodiment, a case where all the first connection structure 501, the second connection structure 601, and the signal line 11 have a same width is taken as an example. In some examples, the first and second connection structures 501 and 601 may be integrally formed with the signal line 11 as a single piece to simplify the manufacturing process.

It should be noted that, the first connection structure 501 or the second connection structure 601 is connected to the main structure 111 of the signal line 11 of the CPW transmission line, and a gap is maintained between the first connection structure 501 or the second connection structure 601 and the first sub-reference electrode 121, and between the first connection structure 501 or the second connection structure 601 and the second sub-reference electrode 122.

Figure 8:
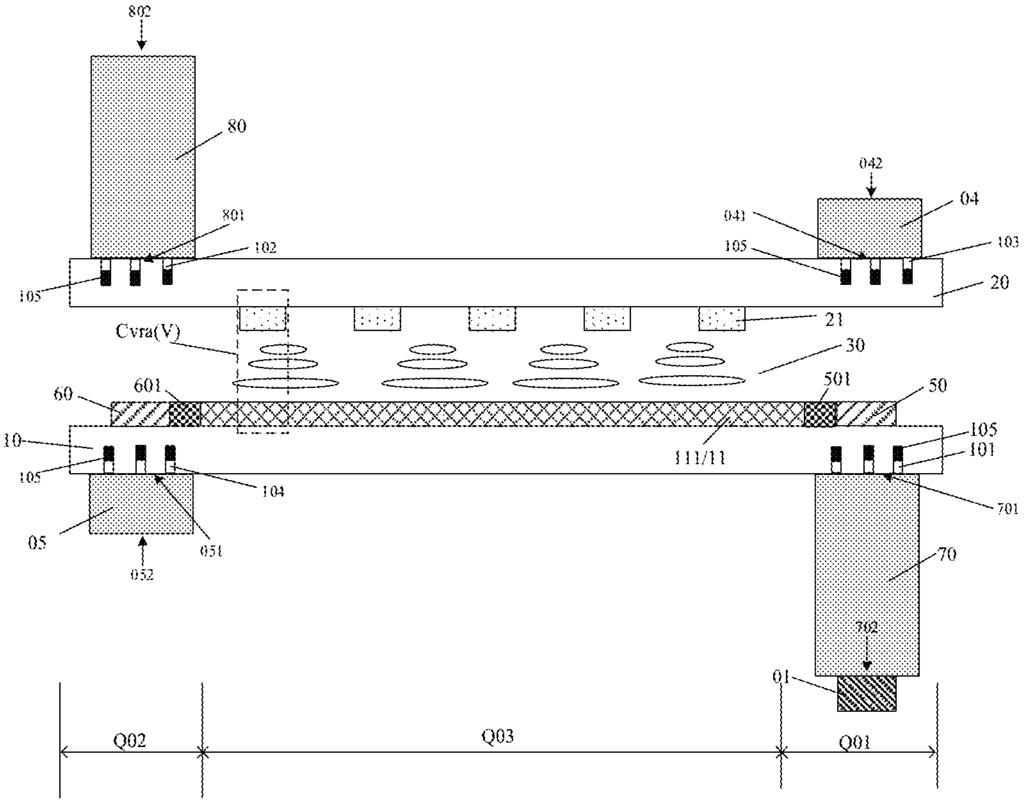
FIG. 8 is a side view of a phase shifter (with a first waveguide structure and a second waveguide structure provided on opposite sides) according to an embodiment of the present disclosure.
Figure 9:
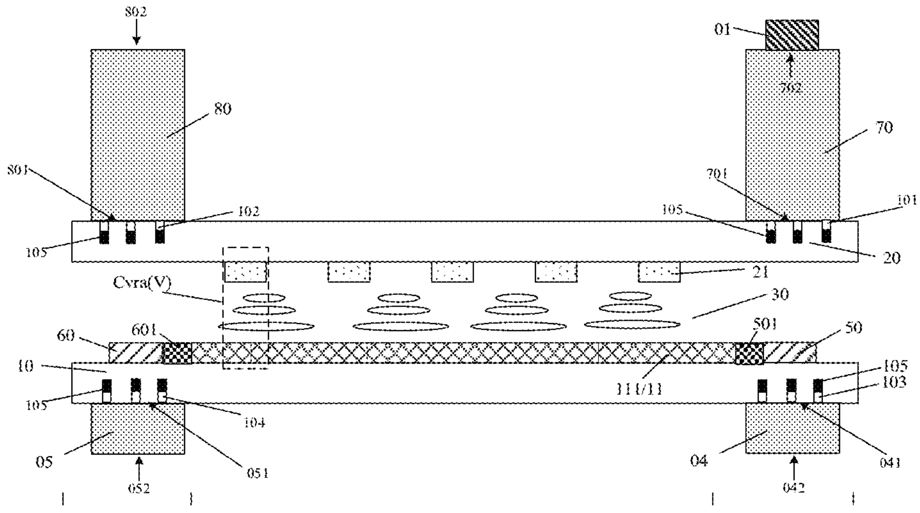
FIG. 9 is a side view of a phase shifter (with a first waveguide structure and a second waveguide structure provided on a same side) according to an embodiment of the present disclosure.

In some examples, referring to FIG. 8 and FIG. 9, the phase shifter may further include a first reflection structure 04 and a second reflection structure 05. The first reflection structure 04 is provided on a side of the first feeding structure 50 away from the first waveguide structure 70. An orthographic projection of the first reflection structure 04 on the first base substrate 10 at least partially overlaps with an orthographic projection of the first port 701 of the first waveguide structure 70 on the first base substrate 10, and at least partially overlaps with an orthographic projection of the first feeding structure 50 on the first base substrate 10. Since the first feeding structure 50 has a longitudinal electric field, the microwave signals are radiated from both sides of the first feeding structure 50 in a longitudinal direction. Signals toward the first waveguide structure 70 are coupled into the first waveguide structure 70, and microwave signals radiated from the first feeding structure 50 toward a side deviating from the first waveguide structure 70 are reflected back into the first waveguide structure 70 by the first reflection structure 04, thereby effectively increasing radiation efficiency. Similarly, the second reflection structure 05 is provided on a side of the second feeding structure 60 away from the second waveguide structure 80. An orthographic projection of the second reflection structure 05 on the second base substrate 20 at least partially overlaps with an orthographic projection of the first port 801 of the second waveguide structure 80 on the second base substrate 20, and at least partially overlaps with an orthographic projection of the second feeding structure 60 on the second base substrate 20. Since the second feeding structure 60 has a longitudinal electric field, microwave signals are radiated from both sides of the second feeding structure 60 in a longitudinal direction. Signals toward the second waveguide structure 80 is coupled into the second waveguide structure 80, and microwave signals radiated from the second feeding structure 60 toward a side deviating from the second waveguide structure 80 is reflected back into the second waveguide structure 80 by the second reflection structure 05, thereby effectively increasing radiation efficiency.

Specifically, if the first waveguide structure 70 and the second waveguide structure 80 are provided on different sides, in a case where the first waveguide structure 70 is provided on a side of the first base substrate 10 away from the dielectric layer 30, the first reflection structure 04 is provided on a side of the second base substrate 20 away from the dielectric layer 30; and in a case where the second waveguide structure 80 is provided on a side of the second base substrate 20 away from the dielectric layer 30, the second reflection structure 05 is provided on a side of the first base substrate 20 away from the dielectric layer 30. If the first waveguide structure 70 and the second waveguide structure 80 are provided on the same side, for example, both the first waveguide structure 70 and the second waveguide structure 80 are provided on a side of the second base substrate 20 away from the dielectric layer 30, the first reflection structure 04 and the second reflection structure 05 are provided on a side of the first base substrate 10 away from the dielectric layer 30.

In some examples, a waveguide structure may be adopted for the first reflection structure 04, and the waveguide cavity of the first reflection structure 04 has a first port 041 and a second port 042. The first port 041 of the first reflection structure 04 directly faces the first port 701 of the first waveguide structure 70, so that an orthographic projection of the first port 041 of the first reflection structure 04 on the first base substrate 10 at least partially overlaps with or completely overlaps with an orthographic projection of the first port 701 of the first waveguide structure 70 on the first base substrate 10. A waveguide structure may be adopted for the second reflection structure 05, and the waveguide cavity of the second reflection structure 05 has a first port 051 and a second port 052. The first port 051 of the second reflection structure 05 directly faces the first port 801 of the second waveguide structure 80, so that an orthographic projection of the first port 051 of the second reflection structure 05 on the second base substrate 20 at least partially overlaps with or completely overlaps with an orthographic projection of the first port 801 of the second waveguide structure 80 on the second base substrate 20.

In some examples, referring to FIG. 8, in a case where the first reflection structure 04 provided opposite to the first waveguide structure 70 is provided in the first feeding region Q01, for example, in a case where the first waveguide structure 70 is provided on the surface of the first base substrate 10 away from the dielectric layer 30, the first reflection structure 04 is provided on the surface of the second base substrate 20 away from the dielectric layer 30. In this case, the first recesses 101 located in the first feeding region Q01 are formed in the first base substrate 10, third recesses 103 located in the first feeding region Q01 are further formed in the second base substrate 20, and the arrangement of the third recesses 103 is the same as that of the first recesses 101. The bottom surface of the first port 701 of the first waveguide structure 70 covers the first recesses 101, and the bottom surface of the first port 041 of the first reflection structure 04 (i.e., the bottom surface of the side wall of the first reflection structure 04) covers the third recesses 103. In addition, a metal conductive structure 105 is filled in each of the first and third recesses 101 and 103. Accordingly, in a case where the second reflection structure 05 provided opposite to the second waveguide structure 80 is provided in the second feeding region Q02, for example, in a case where the second waveguide structure 80 is provided on the surface of the second base substrate 20 away from the dielectric layer 30, and the second reflection structure 05 is provided on the surface of the first base substrate 10 away from the dielectric layer, second recesses 102 located in the second feeding region Q02 are formed in the second base substrate 20, fourth recesses 104 located in the first feeding region Q01 are further formed in the first base substrate 10, and the arrangement of the fourth recesses 104 is the same as that of the second recesses 102. The bottom surface of the first port 701 of the second waveguide structure 80 covers the second recesses 102, and the bottom surface of the first port 051 of the second reflection structure 05 (i.e., the bottom surface of the side wall of the second reflection structure 05) covers the fourth recesses 104. In addition, the second recesses 102 and the fourth recesses 104 each are filled with a metal conductive structure 105.

That is, not only the first recesses 101 are formed in the first base substrate 10 on which the first waveguide structure 70 is correspondingly provided, the second recesses 102 are formed in the second base substrate 20 on which the second waveguide structure 80 is correspondingly provided, but also the third recesses 103 are formed in the second base substrate 20 on which the first reflection structure 04 is correspondingly provided, and the fourth recesses 104 are formed in the first base substrate 10 on which the second reflection structure 05 is correspondingly provided, and the first recesses 101, the second recesses 102, the third recesses 103, and the fourth recesses 104 each are filled with the conductive structure 105. In this case, when a microwave signal fed through the second port 702 of the first waveguide structure 70 is coupled to the first feeding structure 50 through the first recesses 101 and the conductive structures 105 therein; and the microwave signal transmitted upward is reflected by the first reflection structure 04, is coupled to the first feeding structure 50 through the third recesses 103 and the conductive structures 105 therein, and then is transmitted through the transmission line to the second feeding structure 60. The microwave signal received by the second feeding structure 60 is coupled, through the second recesses 102 and the conductive structures 105 therein, to the second waveguide structure 80 to be fed out. The microwave signal transmitted downward is reflected by the second reflection structure 05, is coupled to the second feeding structure 60 through the fourth recessed 104 and the conductive structure 105 therein, and is coupled, through the second recesses 102 and the conductive structures 105 therein, to the second waveguide structure 80 to be fed out again. In this process, it can be seen that, the microwave signal energy loss is greatly reduced.

Referring to FIG. 9, when the first waveguide structure 70 and the second waveguide structure 80 are located on a same side, the first reflection structure 04 and the second reflection structure 05 are also located on a same side. In this case, also as described above, the third recesses 103 may be formed in the first base substrate 10 on which the first reflection structure 04 is provided, and the fourth recesses 104 may be formed in the first base substrate 10 on which the second reflection structure 05 is provided. This structure is substantially the same as the above structure, with a similar principle, and is not repeated herein.

In order to make the specific structure of each of the recesses in the embodiments of the present disclosure clearer, a description will be given to illustrate how to form the first recesses 101, the second recesses 102, the third recesses 103, the fourth recesses 104, and the conductive structures 105 in the phase shifter shown in FIG. 8. A case where the first recesses 101, the second recesses 102, the third recesses 103 and the fourth recesses 104 each are a blind hole is taken as an example. Each of the blind holes may have a size of 0.05 mm to 1 mm, and a pitch between centers of the blind holes may be smaller than one tenth of the wavelength, and smaller this pitch is, a better performance may be obtained. The pitch may of course be increased to one eighth to one fifth of the wavelength, which may cause a slight deterioration in performance. The depth of the blind hole depends on the design but is less than the glass thickness. A glass base substrate (e.g., a white glass) may be used for each of the first and second base substrates 10 and 20. In this case, alignment marks may be first formed on the first base substrate 10, and then the first recesses 101 in the first feeding region Q01 and the fourth recesses 104 in the second feeding region Q02 may be formed by laser drilling, sandblasting, mechanical drilling, and the like. In the same manner, the third recesses 103 in the first feeding region Q01 and the second recesses 102 in the second feeding region Q02 may be formed in the second base substrate 20.

Figure 10:
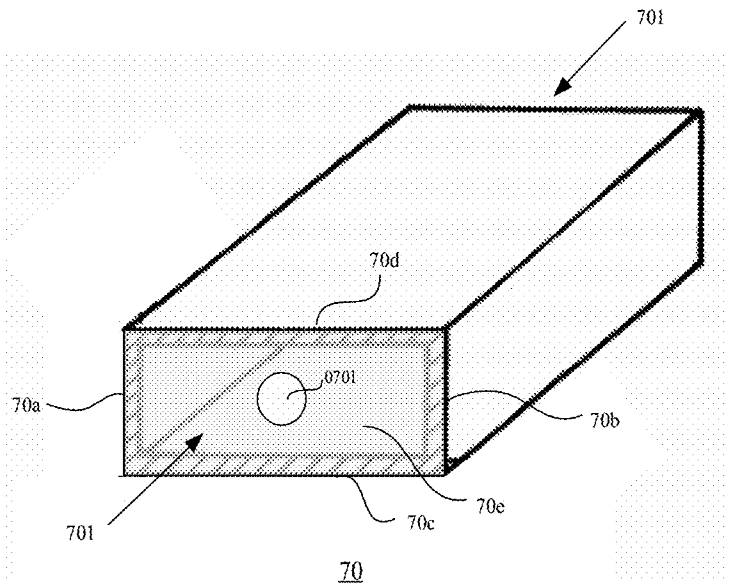
FIG. 10 is a schematic view of a part of a first waveguide structure in a phase shifter according to an embodiment of the present disclosure.

In addition, the conductive structure 105 in each of the recesses may be formed of a metal layer by electroplating, evaporation, magnetron sputtering, and the like, and it is not required that the blind hole is completely filled with metal and it may be better to completely cover the sidewall of the blind hole. However, if the sidewall of the structure may not be completely covered by the metal due to the limit of the process, the feeding efficiency of the structure may be still improved, compared to a structure without such a configuration. Since the metallized blind holes exist in the first feeding region, and the blind holes formed in a same glass base substrate may be equivalent to an ideal electric wall, the energy of the monopole excitation radiation is thus bound in the waveguide structure as much as possible, so that more energy is collected to enhance conversion efficiency. The drilling the blind holes in the glass avoids the issue of liquid crystal leakage caused by the via, and a high performance feeding structure is easy to obtain. Through a simulation experiment, compared to a phase shifter without the first recesses 101, the second recesses 102, the third recesses 103, the fourth recesses 104 and the conductive structures 105, the transmission loss of the phase shifter, which is provided with the first recesses 101, the second recesses 102, the third recesses 103 and the fourth recesses 104 and the conductive structures 105, is reduced to a certain extent in the whole working frequency band. In some examples, the first waveguide structure 70 and the second waveguide structure 80 may be constructed of hollow metal walls. In particular, the first waveguide structure 70 may have at least one first sidewall that connects to form the waveguide cavity of the first waveguide structure 70, and/or the second waveguide structure 80 may have at least one second sidewall that connects to form the waveguide cavity of the second waveguide structure 80. If the first waveguide structure 70 has only one first sidewall, the first waveguide structure 70 is a circular waveguide structure. The first sidewall forms a circular hollow pipe and surrounds to form the waveguide cavity of the first waveguide structure 70. The first waveguide structure 70 may further include a plurality of first sidewalls to form a waveguide cavity of any shape. For example, referring to FIG. 10, the first waveguide structure 70 may include four first sidewalls 70*a* to 70*d*. The first sidewall 70*a* is provided opposite to the first sidewall 70*b*, and the first sidewall 70*c* is provided opposite to the first sidewall 70*d*. The four first sidewalls 70*a* to 70*d* connect together and surround to form a rectangular waveguide cavity, so that the first waveguide structure 70 is a rectangular waveguide. It should be noted that, a bottom surface 70*e* may be included at the second port 702 of the first waveguide structure 70, and the bottom surface 70*e* covers the whole second port 702. The bottom surface 70*e* has an opening 0701 which is matched with one end of the signal connector 01. The signal connector 01 is inserted into the first waveguide structure 70 through the opening 0701, and the other end of the signal connector 01 is connected to an external signal line to input a signal into the first waveguide structure 70. The second waveguide structure 80 is configured in the same manner as the first waveguide structure 70. If the second waveguide structure 80 includes only one second sidewall, the second waveguide structure 80 is a circular waveguide structure. If the second waveguide structure 80 includes a plurality of second sidewalls, the plurality of second sidewalls connect together and surround to form the second waveguide structure 80 having a corresponding shape by encompassment. In the following description, a case where the first waveguide structure 70 and the second waveguide structure 80 are rectangular waveguides is taken as an example, which is not limited thereto.

It should be noted that, the thickness of the first sidewall of the first waveguide structure 70 may be 4 to 6 times of the skin depth of the microwave signal transmitted by the phase shifter; and the thickness of the second sidewall of the second waveguide structure 80 may be 4 to 6 times of the skin depth of the microwave signal transmitted by the phase shifter, which is not limited herein.

Figure 11:
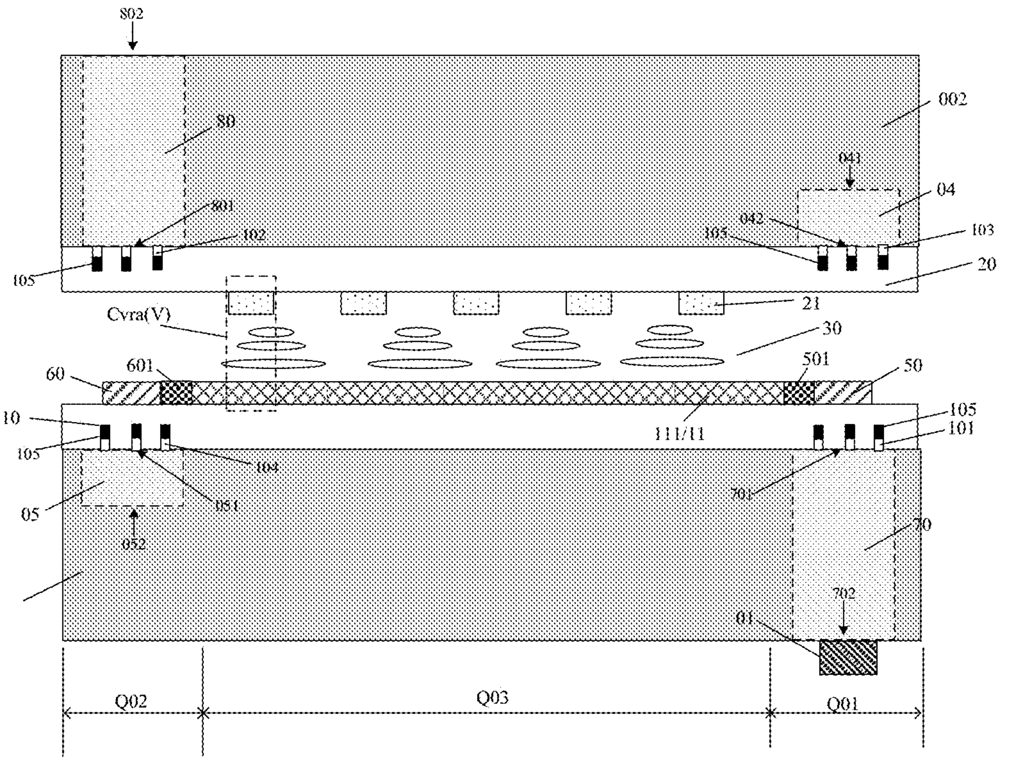
FIG. 11 is a side view of a phase shifter (with a first waveguide structure and a second waveguide structure provided on opposite sides and each being a cavity) according to an embodiment of the present disclosure.
Figure 12:
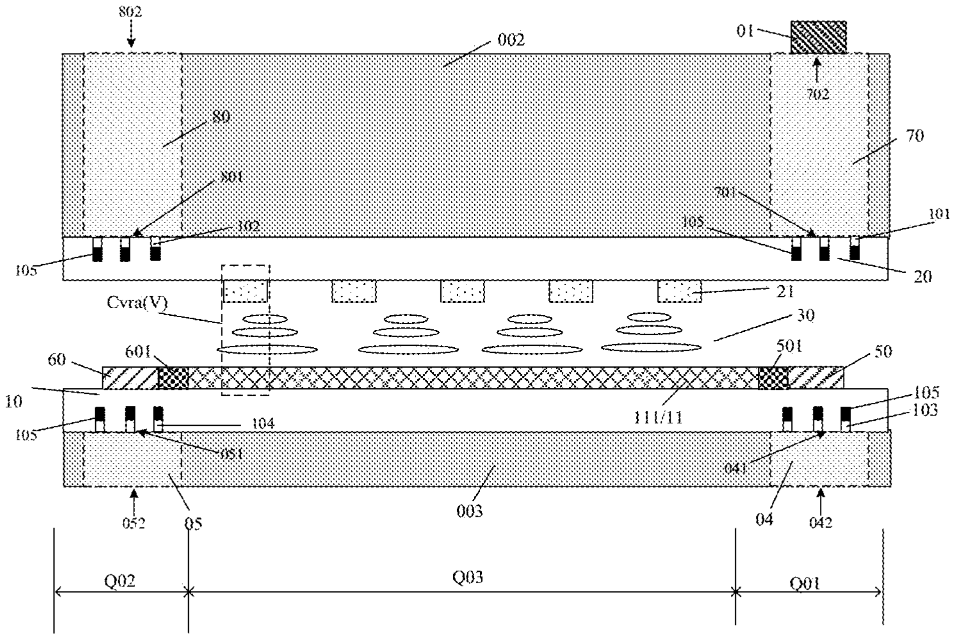
FIG. 12 is a side view of a phase shifter (with a first waveguide structure and a second waveguide structure provided on a same side and each being a cavity) according to an embodiment of the present disclosure.

In some examples, the first waveguide structure 70 and the second waveguide structure 80 may be formed by cavities in a metal block. Specifically, referring to FIG. 11, if the first waveguide structure 70 and the second waveguide structures 80 are provided on different sides, the phase shifter may further include a first metal layer 001 and a second metal layer 002. The first metal layer 001 is provided on a side of the first base substrate 10 away from the dielectric layer 30. The first metal layer 001 has a hollow first cavity therein, and the hollow first cavity has a shape similar to the shape of the first waveguide structure 70 to define the first waveguide structure 70. The first cavity penetrates through the whole first metal layer 001. An opening of the first cavity close to the first base substrate 10 serves as a first port 701 of the first waveguide structure 70, and is connected to a side of the first base substrate 10 away from the dielectric layer 30. An opening of the first cavity away from the first base substrate 10 serves as a second port 702 of the first waveguide structure 70, and is connected to the signal connector 01. Similarly, the second metal layer 002 is provided on a side of the second base substrate 20 away from the dielectric layer 30, and the second metal layer 002 has a hollow second cavity therein. The second cavity has a shape similar to the shape of the second waveguide structure 80 to define the second waveguide structure 80. The second cavity penetrates through the whole second metal layer 002. An opening of the second cavity close to the second base substrate 20 serves as the first port 801 of the second waveguide structure 80, and is connected to a side of the second base substrate 10 away from the dielectric layer 30. An opening of the second cavity away from the second base substrate 20 serves as the second port 802 of the second waveguide structure 80, and is connected to a load (for example, an antenna). If the phase shifter has a first reflection structure 04 and a second reflection structure 05 therein, the second metal layer 002 further has a third cavity therein to define the first reflection structure 04, and the first metal layer 001 further has a fourth cavity therein to define the second reflection structure 05. Referring to FIG. 12, if the first waveguide structure 70 and the second waveguide structure 80 are formed on a same side, the phase shifter may include only the second metal layer 002. The second metal layer 002 is provided on a side of the second base substrate 20 away from the dielectric layer 30. The second metal layer 002 has a first cavity and a second cavity. The first cavity has a shape similar to the shape of the first waveguide structure 70 to define the first waveguide structure 70, and the second cavity has a shape similar to the shape of the second waveguide structure 80 to define the second waveguide structure 80. In this way, an orthographic projection of the first cavity on the second base substrate 20 does not overlap with an orthographic projection of the second cavity on the second base substrate 20, so as to ensure that the waveguide cavities of the first waveguide structure 70 and the second waveguide structure 80 are independent from each other and do not affect each other. If the phase shifter has a first reflection structure 04 and a second reflection structure 05 therein, a third metal layer 003 may be provided on a side of the first base substrate 10 away from the dielectric layer 30, and the third metal layer 003 has a third cavity and a fourth cavity. The third cavity defines the first reflection structure 04, and the fourth cavity defines the second reflection structure 05. Since the lengths of the first and second reflection structures 04 and 05 are smaller than the lengths of the first and second waveguide structures 70 and 80, the thickness of the first metal layer 003 is also smaller than that of the second metal layer 002.

In the phase shifter provided in the embodiment of the present disclosure, in order to apply the structure having the CPW transmission line periodically loaded with variable capacitors Cvra(V) to a phased array antenna and to achieve the function of beam scanning, it is required that the range of an adjustable phase difference of each of the phase shifters is greater than 360°. Therefore, in order to achieve this range, the phase shifters are placed and reasonably arranged in a limited area, and the overall length of the phase shifter is required not too long. Therefore, the capacitance of the variable capacitor Cvra(V) in each period should be sufficiently large, so as to achieve a phase difference in the limited length. However, if the capacitance of the variable capacitor Cvra(V) changes significantly, the impedance of the equivalent transmission line will be caused to change greatly, which will cause a big issue of a bad performance of the port and thus the increased transmission loss.

Figure 13:
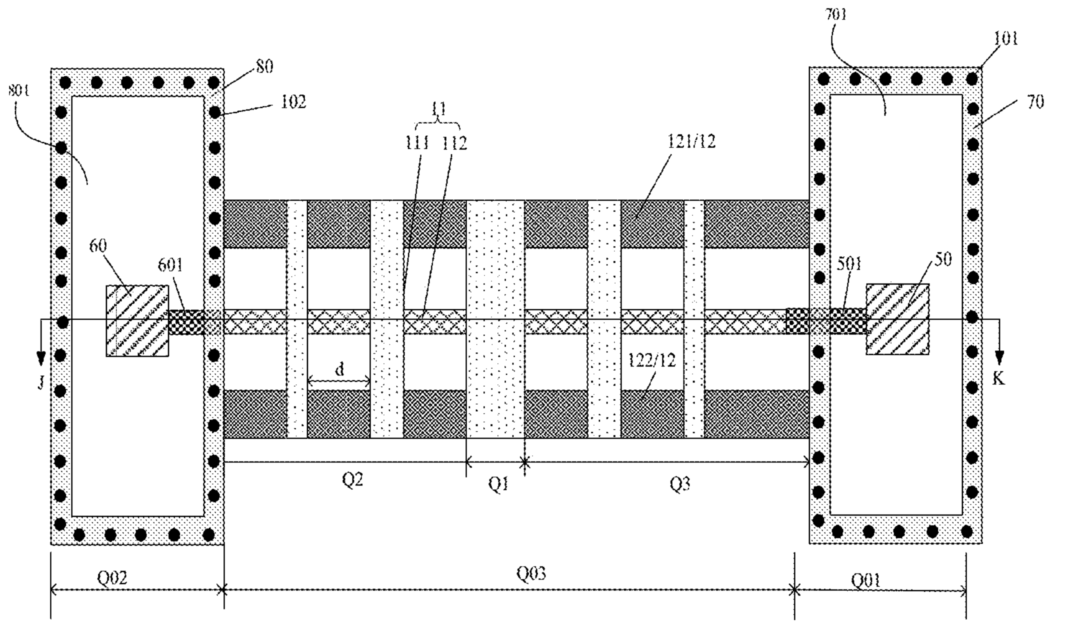
FIG. 13 is a side view of a phase shifter (with different overlapping areas) according to an embodiment of the present disclosure.
Figure 14:
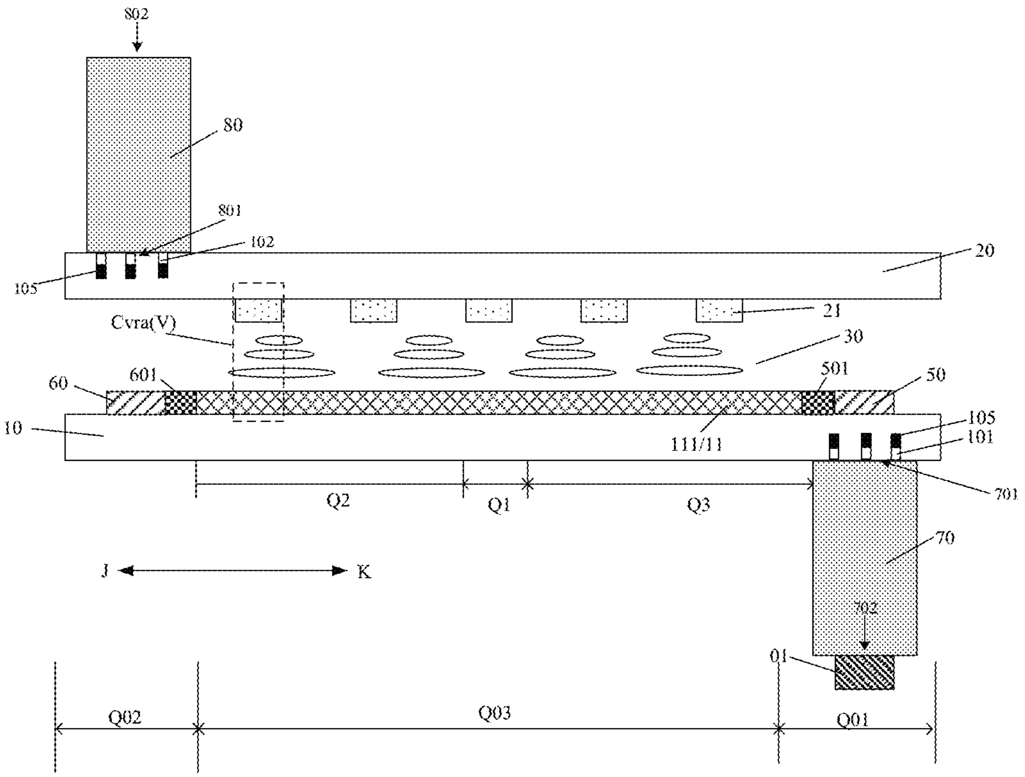
FIG. 14 is a cross-sectional view of the phase shifter along a J-K line of FIG. 13.

In order to solve the above problem, referring to FIG. 13 and FIG. 14, in the embodiment of the present disclosure, the phase shifter may be divided into a first region Q1, and a second region Q2 and a third region Q3 which are respectively provided at two sides of the first region Q1 (i.e., as shown in FIG. 13, the phase shifter may be divided into the second region Q2, the first region Q1, and the third region Q3 from left to right). The overlapping area between the patch electrode 21 and the branch structure 112 of the formed variable capacitor Cvra(V) in each of the second region Q2 and the third region Q3 is smaller than the overlapping area between the patch electrode 21 and the branch structure 112 of the formed variable capacitor Cvra (V) in the first region Q1. Besides, the variable capacitors Cvra(V) in the first region Q1 have a same overlapping area.

When each of the second region Q2 and the third region Q3 is provided with a plurality of variable capacitors Cvra (V), for any two variable capacitors Cvra(V) located on a same side of the first region Q1, the overlapping area between the patch electrode 21 and the branch structure 112 of the variable capacitor Cvra(V) close to the first region Q1 is greater than or equal to the overlapping area between the patch electrode 21 and the branch structure 112 of the variable capacitor Cvra(V) away from the first region Q1.

It should be noted that, an overlapping area refers to an overlapping area between an orthographic projection of the patch electrode 21 on the first base substrate 10 (or the second base substrate 20) and an orthographic projection of the branch structure 112 on the first base substrate 10 (or the second base substrate 20).

Figure 15:
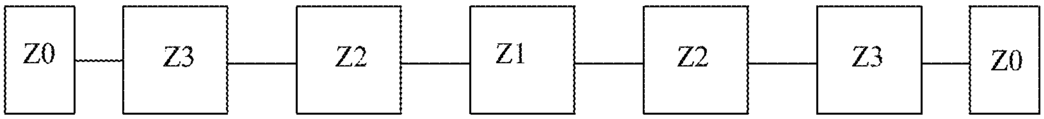
FIG. 15 is a diagram illustrating a change in impedance of the phase shifter in FIG. 13.

Moreover, in the embodiment of the present invention, for any two variable capacitors Cvra(V) on a same side of the first region Q1, the overlapping area between the patch electrode 21 and the branch structure 112 of the variable capacitor Cvra(V) close to the first region Q1 is greater than or equal to the overlapping area between the patch electrode 21 and the branch structure 112 of the variable capacitor Cvra(V) away from the first region Q1. That is, along the length direction of the main structure 111, the capacitances of the formed periodic variable capacitors Cvra(V) tend to increase first and then decrease. The capacitance of the variable capacitor Cvra(V) is positively correlated with an impedance of the variable capacitor Cvra(V), so that along the length direction of the main structure 111, the impedance of the phase shifter tends to increase first and then decrease (as shown in FIG. 15, the impedance along the length direction of the main structure 111 changes in an order of Z0-Z3-Z2-Z1-Z2-Z3-Z0, where Z1>Z2>Z3>Z0). Meanwhile, it should be understood that, the microwave signal is introduced from the two ends of the main structure 111 of the signal line 11, so that the issue of large transmission loss due to reflection of the microwave signal after passing through the periodic variable capacitors Cvra(V) due to the large capacitance of each of the variable capacitors Cvra(V) can be avoided as much as possible.

In some embodiments, only one variable capacitor Cvra (V) is provided in the first region Q1, that is, only one patch electrode and only one branch structure 112 are provided in the first region Q1, and an orthographic projection of the only one patch electrode on the base substrate at least partially overlap with an orthographic projection of the only one branch structure 112 on the base substrate to form the one variable capacitor Cvra(V). The capacitance of the variable capacitor Cvra(V), that is, the overlapping area between the patch electrode and the branch structure 112, should be configured in such a manner that the microwave signal may be phase shifted not less than 360° after passing through the first region Q1, the second region Q2, and the third region Q3.

In some embodiments, the overlapping areas of the variable capacitors Cvra(V) formed in the second region Q2 are different from each other, and/or the overlapping areas of the variable capacitors Cvra(V) formed in the third region Q3 are different from each other. For example, the overlapping areas of the variable capacitors Cvra(V) formed in the second region Q2 and the third region Q3 increase monotonically in the direction approaching the first region Q1. That is, the capacitances of the variable capacitors Cvra(V) formed in the second region Q2 and in the third region Q3 increase regularly in the direction approaching the first region Q1, so that the microwave signal may be transmitted stably, and the transmission loss may be reduced as much as possible.

In some embodiments, the variable capacitors Cvra(V) formed in the second region Q2 and in the third region Q3 are the same in number, and the variable capacitors Cvra(V) formed in the two regions are symmetrically arranged with respect to the first region Q1. That is, the capacitances (or overlapping areas) of the variable capacitors Cvra(V) formed in the second region Q2 and in the third region Q3 change in a same manner in the direction approaching the first region Q1. Therefore, the microwave signal may be transmitted more stably, and the transmission loss may be reduced as much as possible.

In some embodiments, as shown in FIG. 13 and FIG. 14, in order to achieve different overlapping areas of the variable capacitors Cvra(V), the lengths of the branch structures 112 are configured to be the same. By providing the widths of the branch structures 112 in different variable capacitors Cvra (V), for any two variable capacitors Cvra(V) located on a same side of the first region Q1, the overlapping area between the patch electrode 21 and the branch structures 112 of the variable capacitors Cvra(V) close to the first region Q1 each is greater than or equal to the overlapping area of the patch electrode 21 and the branch structures 112 of the variable capacitors Cvra(V) away from the first region Q1.

In some embodiments, the pitches between the variable capacitors Cvra(V) are the same. In this case, the pitches between the patch electrodes 21 may be set to a same pitch, while the pitches between the branch structures 112 may also be set to a same pitch. Of course, the pitches between the variable capacitors Cvra(V) (or between the patch electrodes 21, or between the branch structures 112) may be designed to monotonically increase or decrease according to a certain rule; or the pitches between the variable capacitors Cvra(V) (or between the patch electrodes 21, or between the branch structures 112) may also be designed to be different from each other, and do not have a certain arrangement rule, which is not limited in the embodiment of the present invention.

When the phase shifter with the CPW transmission line periodically loaded with variable capacitors provided in the embodiment of the present disclosure is manufactured and applied to an array antenna, since a pitch in the array antenna is generally required to be 0.5λ to 0.6λ, where λ is a vacuum wavelength of a microwave signal corresponding to a work frequency of the phase shifter, in order to meet this requirement, a layout area left for the phase shifter under each radiation unit is only 0.5×0.5λ, while the phase shifter needs to achieve a phase shift angle of 360°, so it is required to bend the CPW transmission line to a certain extent.

Figure 16:
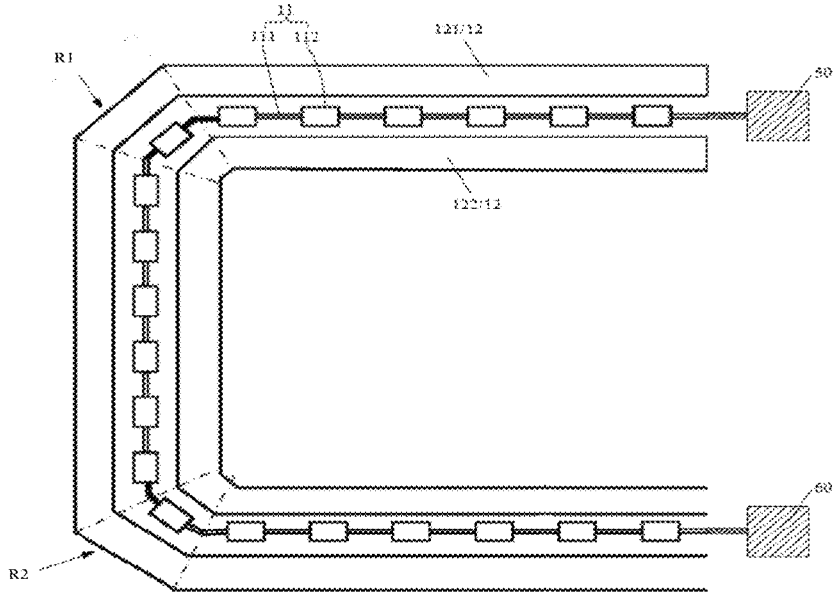
FIG. 16 is a top view of a phase shifter (with a bending configuration) according to an embodiment of the present disclosure.

In some examples, as shown in FIG. 16, the signal line 11 of the CPW transmission line has at least one bending corner, and accordingly, the reference electrode 12 (including the first sub-reference electrode 121 and the second sub-reference electrode 122) also has at least one bending corner. The at least one bending corner of the reference electrode 12 is provided in one-to-one correspondence with the at least one bending corner of the signal line 11. That is, at the one bending corner of the signal line 11, the reference electrode 12 is also bent along the bending direction of the bending corner. For example, as shown in FIG. 16, the signal line 11 has two bending corners, and may be divided into three portions including a first portion, a second portion and a third portion. The first portion and the second portion extend along a third direction, the third portion is provided between the first portion and the second portion and extends along a fourth direction, and the third direction may be approximately perpendicular to the fourth direction. A connection portion between the first portion and the third portion forms a first bending corner, and a connection portion between the second portion and the third portion forms a second bending corner. The first portion, the second portion and the third portion are connected together to make the signal line 11 be arranged in a U-shape, and then the reference electrode 12 is also arranged in a U-shape along the bending direction of the signal line 11. The signal line 11 and the reference electrode 12 may alternatively be arranged in an annular shape, an S-shape, or any other structure. When the signal line 11 and the reference electrode 12 are arranged in the U-shape, they may have two sub-corner regions, for example a first sub-corner region R1 and a second sub-corner region R2, as shown in FIG. 16; when the signal line 11 and the reference electrode 12 are arranged in the annular shape, the signal line 11 and the reference electrode 12 may have four sub-corner regions; and when the signal line 11 and the reference electrode 12 are arranged in the S-shape, the signal line 11 and the reference electrode 12 may have multiple sub-corner regions, which are not limited herein.

In some examples, the first and/or second waveguide structures 70 and/or 80 may have a filling medium therein to increase the dielectric constant of the entire first and/or second waveguide structures 70 and/or 80, so that the first and second waveguide structures 70 and 80 may be reduced in size. The filling medium may include any kind of medium, for example, the filling medium may be polytetrafluoroethylene.

In some embodiments, various materials of substrates may be used for the first base substrate 10, the second base substrate 20, and the third base substrate 03, for example, a glass substrate with a thickness of 100 to 1000 micrometers may be adopted; a sapphire substrate may be adopted; a polyethylene terephthalate substrate with a thickness of 10 to 500 micrometers, a triallyl cyanurate substrate and a polyimide transparent flexible polyimide substrate may be adopted; and a foam substrate, a printed circuit board (PCB), and the like may alternatively be adopted.

In some embodiments, the patch electrode 21, the branch structure 112, the main structure 111, the reference electrode 12, the first feeding structure 50, the second feeding structure 60, the first connection structure 501, and the second connection structure 601 each may be made of a metallic material, such as aluminum, silver, gold, chromium, molybdenum, nickel, or iron.

In a second aspect, the present disclosure provides an antenna including at least one phase shifter described above. In some examples, the antenna may further include at least one radiation unit 90, one of which is provided corresponding to the second port 802 of the second waveguide structure 80 of one of the at least one phase shifter. That is, if the antenna is used as a transmitting antenna, the signal is coupled to the first port 801 of the second waveguide structure 80 through the second feeding structure 60, and then is transmitted to the radiation unit 90 corresponding to the second port 802 of the second waveguide structure 80 through the second port 802 of the second waveguide structure 80. If the antenna is used as a receiving antenna, the signal is received by the radiation unit 90, then is transmitted to the second port 802 of the second waveguide structure 80 corresponding to the radiation unit 90, and then is coupled to the second feeding structure 60 through the first port 801 of the second waveguide structure 80. In the antenna provided by the embodiment of the present disclosure, any number of radiation units 90 may be included such that one of the at least one phase shifter is connected to one of the radiation units 90 to adjust the phase of the radiation unit 90, and in the array antenna, the phases of the radiation units 90 are adjusted to control the transmission direction of a beam, thereby forming a phased array antenna. The following description will be given by taking the radiation units 90 arranged in a 1×3 array as an example.

Figure 17:
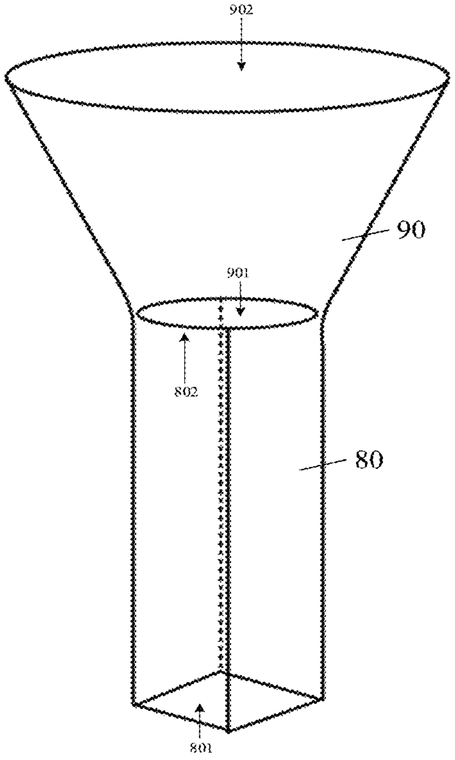
FIG. 17 is a schematic diagram illustrating a structure of a radiation unit of an antenna (a horn antenna) according to an embodiment of the present disclosure.
Figure 18:
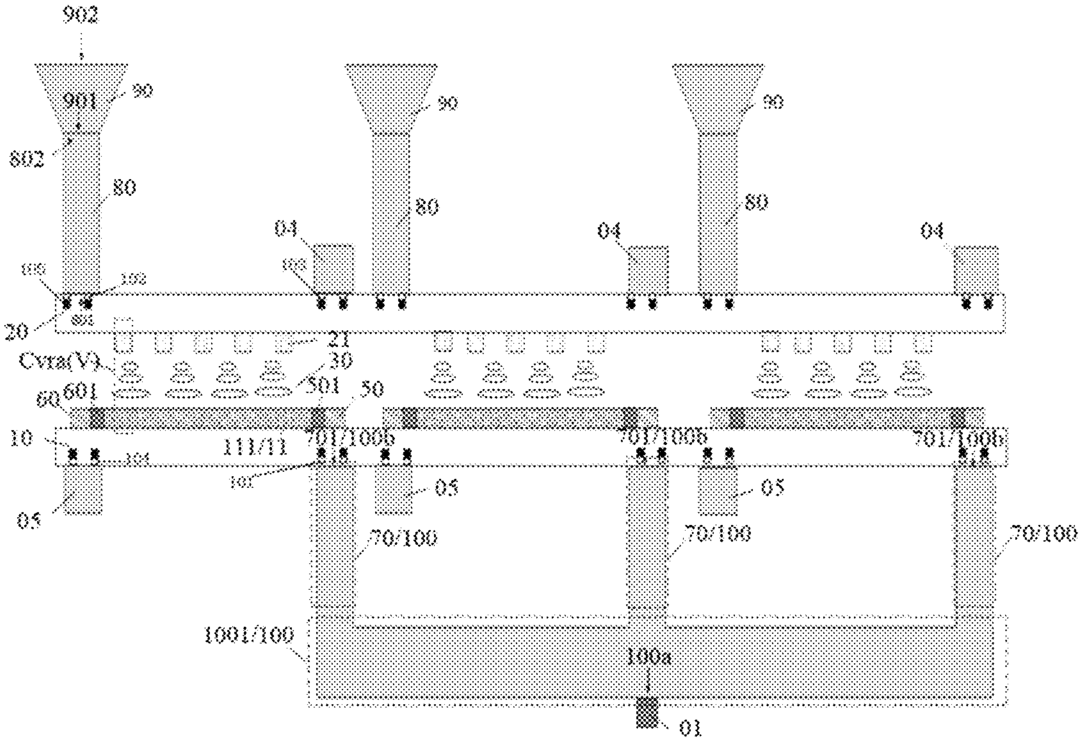
FIG. 18 is a side view of an antenna according to an embodiment of the present disclosure.

In some examples, referring to FIG. 17 and FIG. 18, the radiation unit 90 may be of any structure, such as a waveguide structure or a radiation patch. Taking the radiation unit 90 being a waveguide structure as an example, the radiation unit 90 may be a third waveguide structure. The third waveguide structure (i.e., the radiation unit 90) includes a first port 901 close to the second waveguide structure 80 and a second port 902 away from the second waveguide structure 80. The first port 901 of the third waveguide structure is connected to the second port 802 of the second waveguide structure 80 corresponding to the third waveguide structure.

A size of an opening of the second port of the third waveguide structure is greater than that of the first port of the third waveguide structure, and the third waveguide structure (i.e., the radiation unit 90) may be a horn antenna, as shown in FIG. 17. A size of an opening of the third waveguide structure relatively away from the second waveguide structure 80 is not less than a size of an opening relatively close to the second waveguide structure 90. That is, the size of the opening of the third waveguide structure gradually increases along a direction from the first port 901 to the second port 902 of the third waveguide structure, so as to form a horn-shaped cavity. In some examples, the third waveguide structure may be integrally formed with the second waveguide structure as a single piece to simplify the process.

In some examples, referring to FIG. 17, if the second waveguide structure 80 is a rectangular waveguide. That is, the second waveguide structure 80 includes four second sidewalls. The four second sidewalls are connected to define a waveguide cavity of the second waveguide structure 80. The first port 901 of the third waveguide structure is connected to the second port 802 of the second waveguide structure 80 corresponding to the third waveguide structure. If the waveguide cavity of the third waveguide structure is a horn-shaped cavity, the third waveguide structure includes one third sidewall. The third sidewall surrounds to form the waveguide cavity of the third waveguide structure, and the extending direction of the third sidewall intersects with the extending direction of the second base substrate 20. Since the first port 901 of the third waveguide structure is connected to the second port 802 of the second waveguide structure 80 corresponding to the third waveguide structure, along a direction from the second waveguide structure 80 towards the third waveguide structure (i.e., the radiation unit 90), the shape of the waveguide cavity of the second waveguide structure 80 gradually transitions to the shape of the first port 901 of the third waveguide cavity. That is, the rectangular cavity of the second waveguide structure 80 gradually transitions to the shape of an circular opening of the lower end of the third waveguide structure, i.e., the rectangular opening gradually changing to the circular opening, to form an integrated waveguide cavity as a single piece, so that when a microwave signal is transmitted, conversion between rectangular opening and circular opening may be realized. The transmission loss in the rectangular waveguide cavity of the second waveguide structure 80 at the lower end is small, and the rectangular waveguide cavity gradually transitions to the horn-shaped waveguide cavity of the third waveguide structure 80 at the upper end, so that a circularly polarized microwave signal is realized. That is, the included angle between the polarization plane of the microwave signal and the earth normal plane periodically changes in a range from 0 to 360°. In some examples, a protruding electrode may be provided on an inner wall of the third waveguide cavity to obtain a left-hand circular polarized antenna or a right-hand circular polarized antenna.

In some examples, with continued reference to FIG. 18, the antenna includes a plurality of radiation units 90 and a plurality of phase shifters, one radiation unit 90 is provided corresponding to the second port 802 of the second waveguide structure of one phase shifter, and each phase shifter has one first waveguide structure 70. The first waveguide structures 70 of the plurality of phase shifters are connected to form a waveguide power division network 100, and the waveguide power division network has one main port 100*a* and a plurality of sub-ports 100*b*.

The main port 100*a* of the waveguide power division network 100 is connected to an external signal line, and for example, the main port 100*a* may be connected to a signal connector 01. The signal transmitted through the external signal line is received by the main port 100*a* and divided into a plurality of sub-signals. Each of the sub-signals is output through one sub-port 100*b*. Specifically, the waveguide power division network 100 may have one main waveguide structure 1001 extending in an extending direction parallel (or approximately parallel) to the first base substrate 10. The main port 100*a* may be provided at a midpoint of the main waveguide structure 1001 in the extending direction. The plurality of first waveguide structures 70 may extend in a direction perpendicular (or approximately perpendicular) to the first base substrate 10, and the second ports 702 of the plurality of first waveguide structures 70 are connected to the main waveguide structure. The first port 701 of each of the first waveguide structures 70 serves as one sub-port 100*b* of the waveguide power division network. The signal is received by the main port 100*a* and divided into a plurality of sub-signals, and one of the sub-signals enters one first waveguide structure 70 and is coupled to the first feeding structure 50 corresponding to the first waveguide structure 70 through the first port 701 of the first waveguide structure 70.

Figure 19:
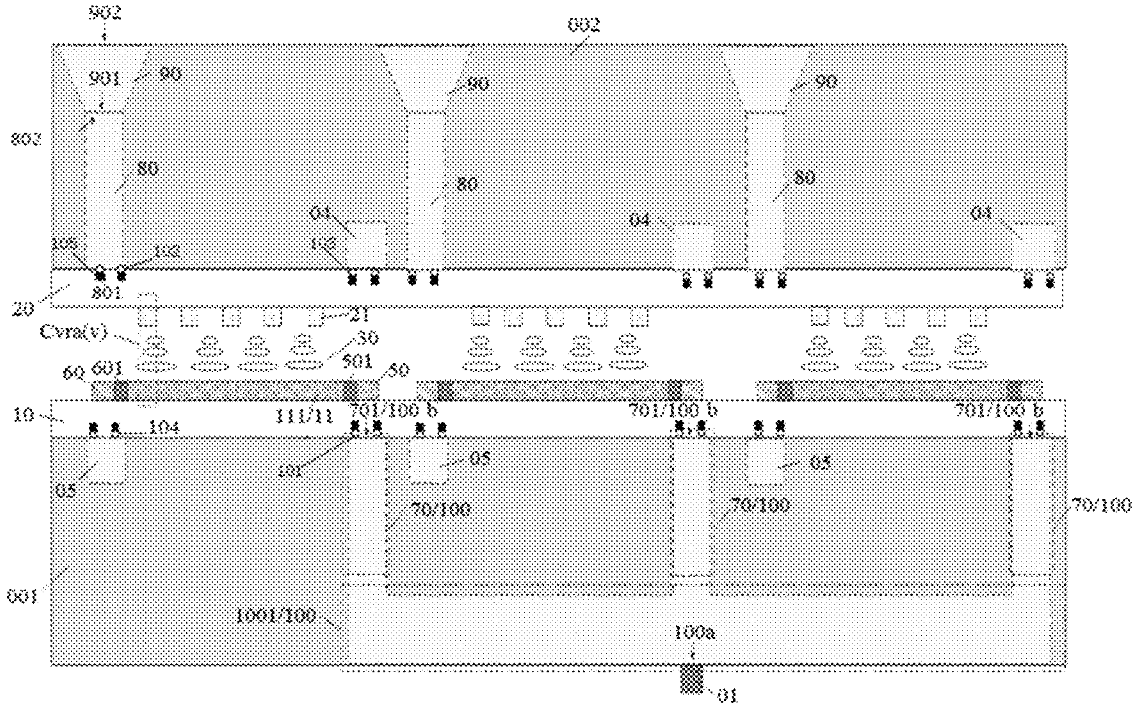
FIG. 19 is a side view of an antenna (in which a cavity within a metal layer forms a waveguide structure) according to an embodiment of the present disclosure.

In some examples, similar to the above, referring to FIG. 19, the first waveguide structures 70 and the second waveguide structures 80 in the plurality of phase shifters, and the plurality of radiation units 90 as the third waveguide structures, may be formed of cavities in metal blocks. The case in which the first waveguide structures 70 and the second waveguide structures 80 are provided on different sides are taken as an example. The antenna may include a first metal layer 001 and a second metal layer 002. The first metal layer 001 is provided on a side of the first base substrate 10 away from the dielectric layer 30, and the first metal layer 001 has a plurality of hollow first cavities therein. The plurality of first cavities are shaped like the first waveguide structures 70 to define the first waveguide structures 70 of the plurality of phase shifters, and the plurality of first cavities are connected to form a waveguide power division network. Similarly, the second metal layer 002 is provided on a side of the second base substrate 20 away from the dielectric layer 30. The second metal layer 002 has a plurality of hollow second cavities and a plurality of hollow fifth cavities therein. The plurality of second cavities are shaped as the second waveguide structures 80 to define second waveguide structures 80 of the plurality of phase shifters. The plurality of fifth cavities are shaped as the third waveguide structures to define the plurality of radiation units 90 as the third waveguide structures. In some examples, the second waveguide structures 80 and the third waveguide structures may be integrally formed as a single piece. The second waveguide structures 80 and the third waveguide structures connected to each other are formed in the second metal layer 002 by a single process. If the phase shifter of the antenna has a first reflection structure 04 and a second reflection structure 05 therein, the second metal layer 002 further has a third cavity therein to define the first reflection structure 04, and the first metal layer 001 further has a fourth cavity therein to define the second reflection structure 05. If the first waveguide structure 70 and the second waveguide structure 80 are provided on a same side, similar to the above, the antenna may only include the second metal layer 002. The second metal layer 002 is provided on a side of the second base substrate 20 away from the dielectric layer 30. The second metal layer 002 has a plurality of first cavities, a plurality of second cavities, and a plurality of fifth cavities. The plurality of first cavities are shaped as the first waveguide structure 70 to define the first waveguide structures 70, and the plurality of first cavities are connected to form or define a waveguide power division network. The plurality of second cavities are shaped as the second waveguide structure 80 to define the second waveguide structures 80. The plurality of fifth cavities are shaped as the third waveguide structure to define the radiation units 90. In this way, orthographic projections of the plurality of first cavities on the second base substrate 20 do not overlap with orthographic projections of the plurality of second cavities on the second base substrate 20, and orthographic projections of the plurality of first cavities do not overlap with orthographic projections of the plurality of fifth cavities on the second base substrate 20, so that the waveguide cavities of the first waveguide structures 70 and the second waveguide structures 80 (and the third waveguide structures) are independent from each other and do not affect each other. If the phase shifter has a first reflection structure 04 and a second reflection structure 05, a third metal layer 003 may be provided on a side of the first base substrate 10 away from the dielectric layer 30. The third metal layer 003 has a third cavity and a fourth cavity. The third cavity defines the first reflection structure 04, and the fourth cavity defines the second reflection structure 05. Since the lengths of the first and second reflection structures 04 and 05 are smaller than the lengths of the first and second waveguide structures 70 and 80, the thickness of the first metal layer 003 is also smaller than that of the second metal layer 002.

Figure 20:
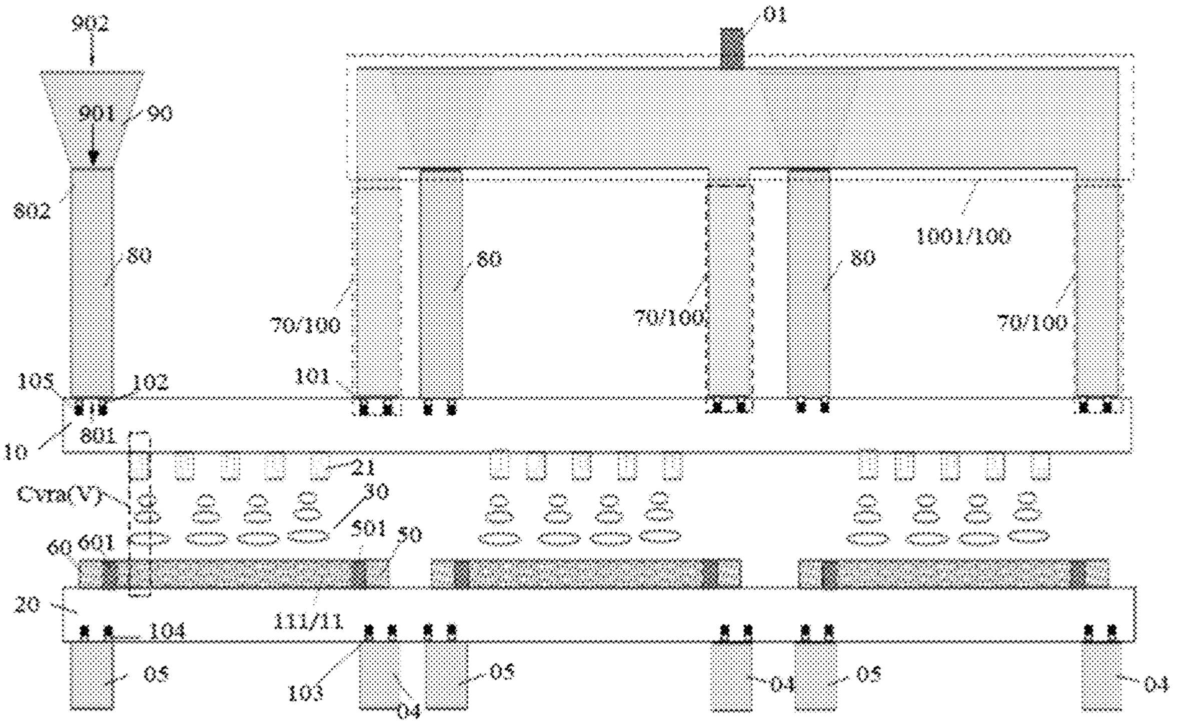
FIG. 20 is a side view of an antenna (with a waveguide power division network, a second waveguide structure and a radiation unit on a same side) according to an embodiment of the present disclosure.
Figure 21:
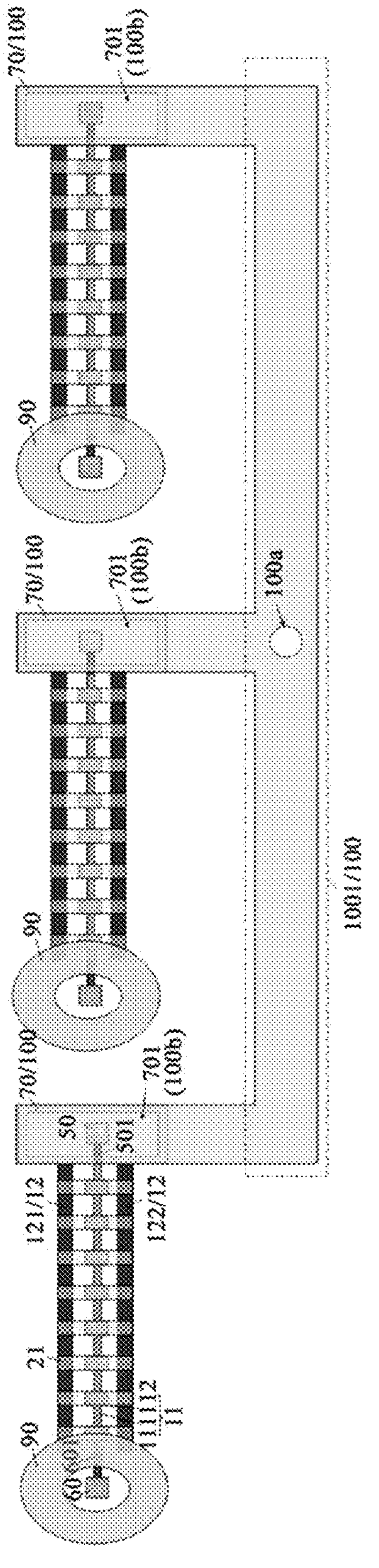
FIG. 21 is a top view of the antenna in FIG. 20.

In some examples, referring to FIG. 20 and FIG. 21, if the first waveguide structure 70 and the second waveguide structure 80 in the phase shifter, and the radiation unit 90 as the third waveguide structure each are formed of a hollow pipe made of a metal wall (i.e., formed by connecting at least one sidewall), and the first waveguide structure 70 and the second waveguide structure 80 are provided on a same side, a plurality of first waveguide structures 70 are connected by the main waveguide structure 1001 to form a waveguide power division network 100. The main waveguide structure 1001 of the waveguide power division network 100 has an opening as the main port 100*a*. The signal connector 01 is inserted into the waveguide power division network 100 through the main port 100*a* to input a signal to the waveguide power division network 100. Referring to FIG. 21, the waveguide power division network 100 is provided on a side of the second base substrate 20 away from the dielectric layer 30, and a plurality of radiation units 90 are connected to corresponding second waveguide structures 80 and are also provided on a side of the second base substrate 20 away from the dielectric layer 30. An orthographic projection of the waveguide power division network 100 on the second base substrate 20 does not overlap with orthographic projections of the plurality of second waveguide structures 80 and the plurality of radiation units 90 on the second base substrate 20, so as to ensure that the waveguide power division network 100 is independent from and does not influence the plurality of second waveguide structures 80 and the plurality of radiation units 90. It should be noted that, the arrangement of the waveguide power division networks in FIG. 20 and FIG. 21 is only an example, and the waveguide power division networks may be arranged on the second base substrate 20 along various directions, as long as the waveguide power division networks are independent from the plurality of second waveguide structures 80 and the plurality of radiation units 90, which is not limited herein.

Figure 22:
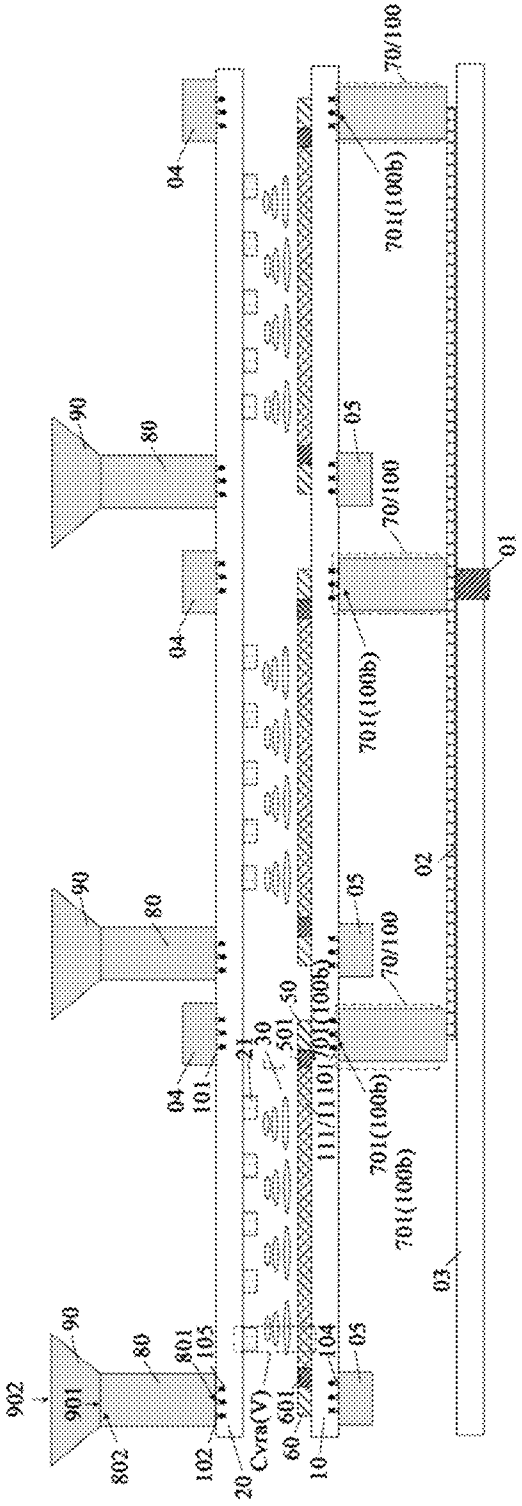
FIG. 22 is a side view of an antenna (with a third substrate) according to an embodiment of the present disclosure.
Figure 23:
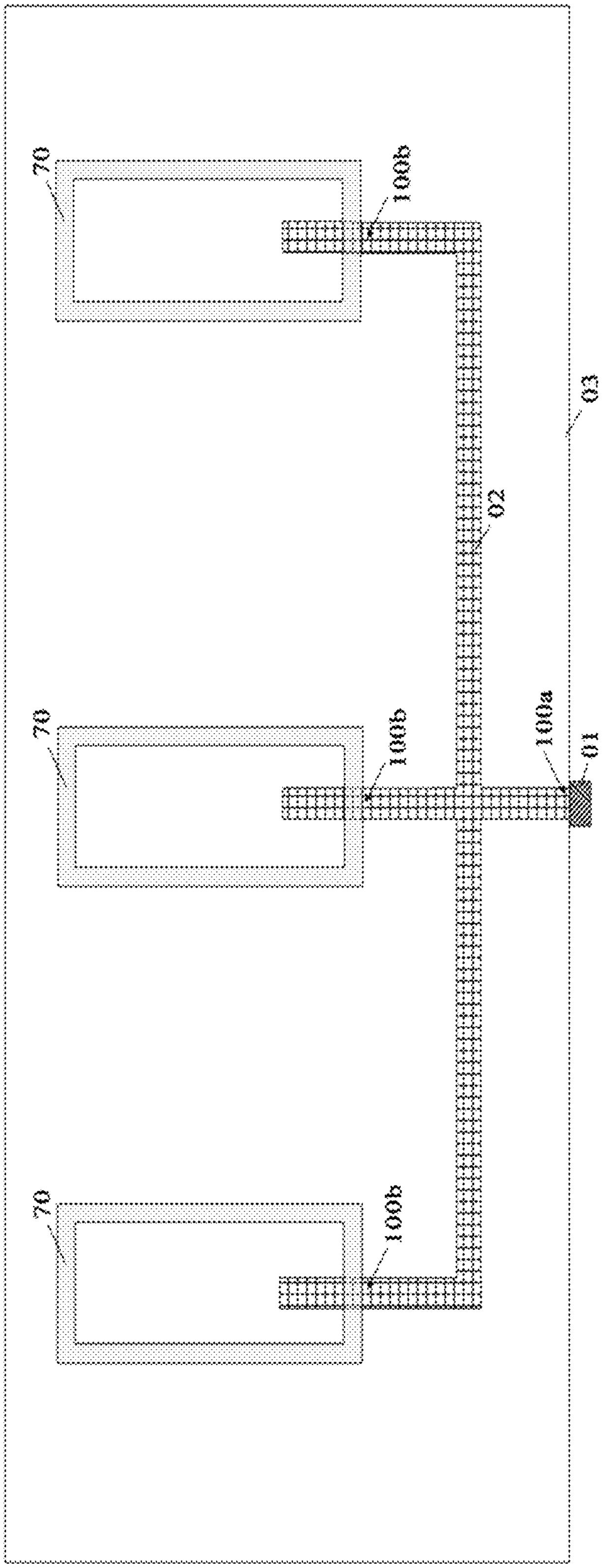
FIG. 23 is a top view of a part of the phase shifter at a third substrate in FIG. 22.

In some examples, referring to FIG. 22 and FIG. 23, similar to the above, the antenna provided by the embodiment of the present disclosure may further include a third substrate. The third substrate is connected to the second ports 702 of the plurality of first waveguide structures 70. The third substrate includes a third base substrate 03 and a feeding transmission line 02. The third base substrate 03 is connected to the second ports 702 of the plurality of first waveguide structures 70. The feeding transmission line 02 is provided on a side of the third base substrate 03 away from the first waveguide structures 70. Referring to FIG. 21, the feeding transmission line 02 is arranged as a power division feeding structure, and has a main line segment and a plurality of sub-line segments. The main line segment has a main port 100*a* at a midpoint of the feeding transmission line 02 in the length direction, and extends to an edge of the third base substrate 03 to connect an external signal line. Specifically, a signal connector 01 may be provided on an edge of the third base substrate 03, has one end connected to the main port 100*a* of the power division feeding structure formed by the feeding transmission line 02, and has the other end connected to the external signal line, so as to input a signal to the power division feeding structure. First ends of the plurality of sub-line segments of the power division feeding structure formed by the feeding transmission line 02 are connected to the main line segment, and a second end of the sub-line segments as a sub-port 100*b* extends to a second port 702 of one first waveguide structure 70, so as to feed sub-signals into the waveguide cavity of the first waveguide structure 70. Specifically, the second end of each of the sub-line segments may extend into the second port 702 of the first waveguide structure 70 to which a signal is to be fed, i.e., an orthographic projection of the second end of the sub-line segment on the first base substrate 10 is within an orthographic projection of the second port 702 of the first waveguide structure 70 on the first base substrate 10.

Figure 24:
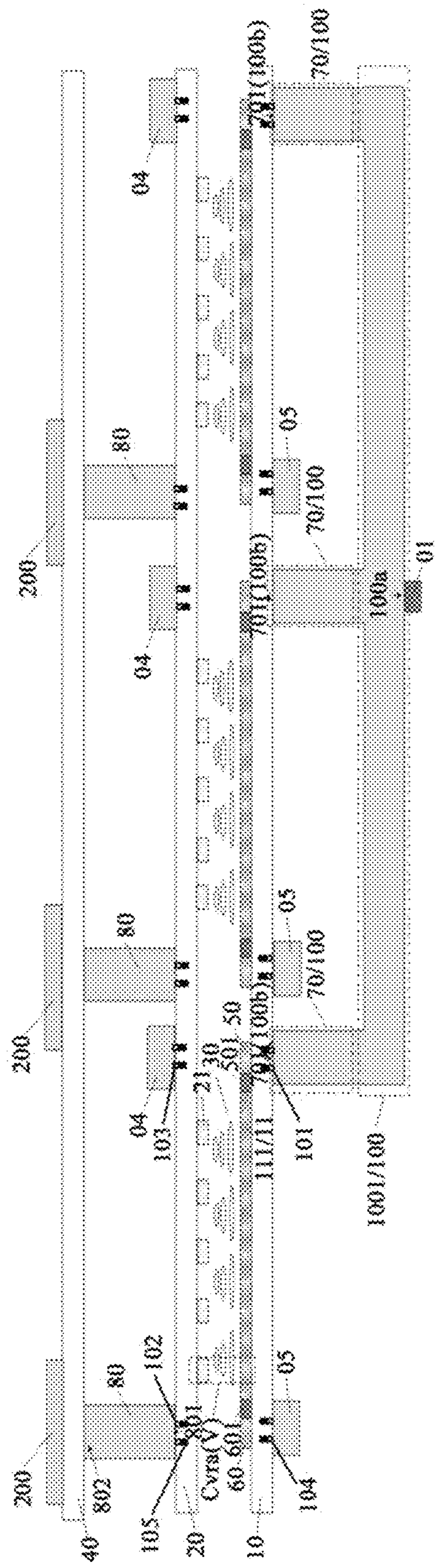
FIG. 24 is a side view of an antenna (a radiation patch) according to an embodiment of the present disclosure.
Figure 25:
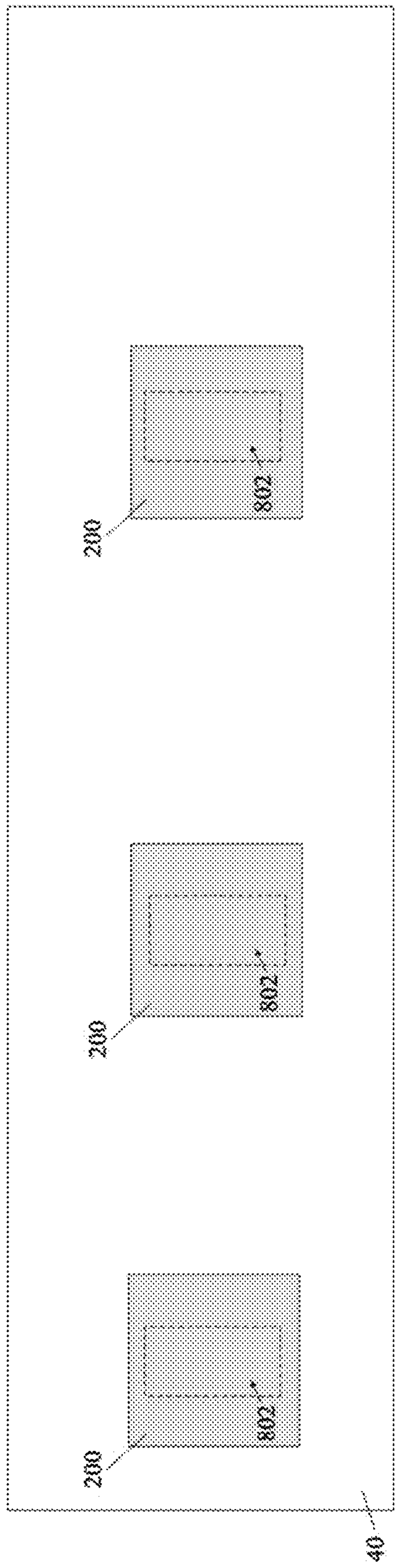
FIG. 25 is a top view of the antenna in FIG. 24.

In some examples, referring to FIG. 24 and FIG. 25, a dashed box in FIG. 25 indicates a position of an orthographic projection of the second port 802 of the second waveguide structure 80 on the fourth substrate 40. In the antenna provided in the embodiment of the present disclosure, at least one radiation unit 90 each may also include a radiation patch, and the antenna may further include the fourth substrate 40. The second port 802 of the second waveguide structure 80 of one phase shifter in the antenna corresponds to one radiation unit 90. That is, the second waveguide structure 80 of one phase shifter outputs a signal to one radiation unit 90 (or receives a signal transmitted by the radiation unit 90) which is a radiation patch. The second port 802 of the second waveguide structure 80 of each of at least one phase shifter is connected to the fourth substrate 40. The radiation patch may be provided on a side of the fourth substrate 40 away from the second port 802 of the second waveguide structure 80. The second waveguide structure 80 feeds power to the radiation unit 90 by matching and coupling the openings of the second waveguide structure 80 and the radiation unit 90. That is, an orthographic projection of the radiation unit 90 as the radiation patch on the fourth substrate 40 at least partially overlaps with an orthographic projection of the second port 802 of the second waveguide structure 80 corresponding to the radiation patch on the fourth substrate, so that a microwave signal output at the second port 802 of the second waveguide structure 80 may pass through the fourth substrate 40, may be coupled to the radiation unit 90 overlapping with the second port 802 of the second waveguide structure 80, and is radiated by the radiation unit 90, or the signal after received by the radiation unit 90 is coupled to the second port 802 of the second waveguide structure 80 overlapping with the radiation unit 90 through the fourth substrate 40. In some examples, an orthographic projection of the radiation unit 90 as the radiating patch on the fourth substrate 40 may cover an orthographic projection of the second port 802 of the second waveguide structure 80 on the fourth substrate 40. In some examples, if the radiation unit 90 has a center-symmetric pattern, and the second port 802 of the second waveguide structure 80 has a center-symmetric pattern, and a distance between an orthographic projection of a symmetric center of the radiation unit 90 on the fourth substrate 40 and an orthographic projection of a symmetric center of the second port 802 of the second waveguide structure 80 on the fourth substrate 40 is not greater than a third preset value, which should be as small as possible, for example, less than 0.1 cm. If the third preset value is 0, the radiation unit 90 and the second port 802 of the second waveguide structure 80 are directly opposite to each other, and have the symmetric centers coinciding with each other.

In some examples, the fourth substrate 40 may be a substrate of any material. For example, for the fourth substrate 40, a glass substrate with a thickness of 100 to 1000 microns may be adopted; a sapphire base substrate may be adopted; a polyethylene terephthalate substrate with a thickness of 10 to 500 microns, a triallyl cyanurate substrate, a polyimide transparent flexible substrate may be adopted, and a foam substrate, a printed circuit board (PCB), and the like may be adopted.

Figure 26:
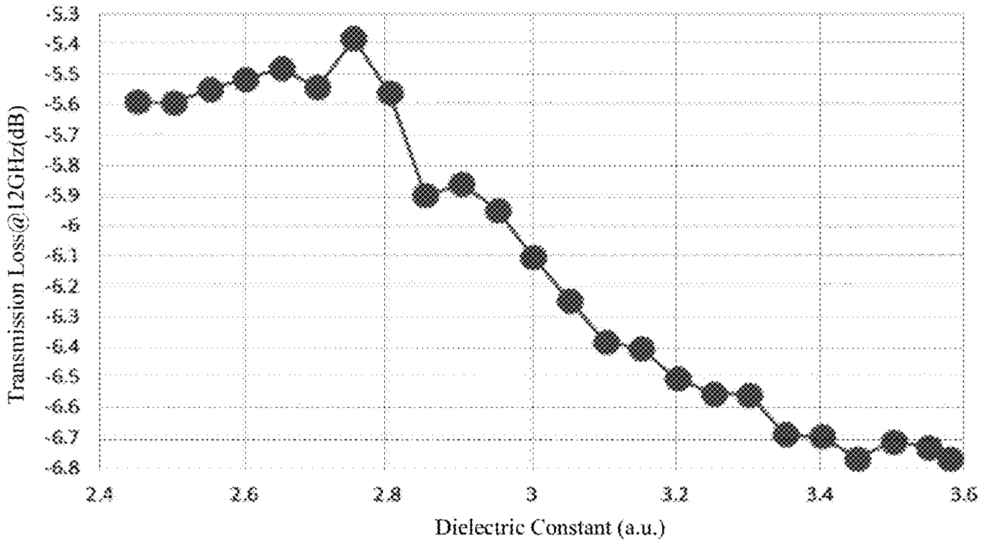
FIG. 26 is a simulation graph illustrating a dielectric constant varying with transmission loss of an antenna according to an embodiment of the present disclosure.
Figure 27:
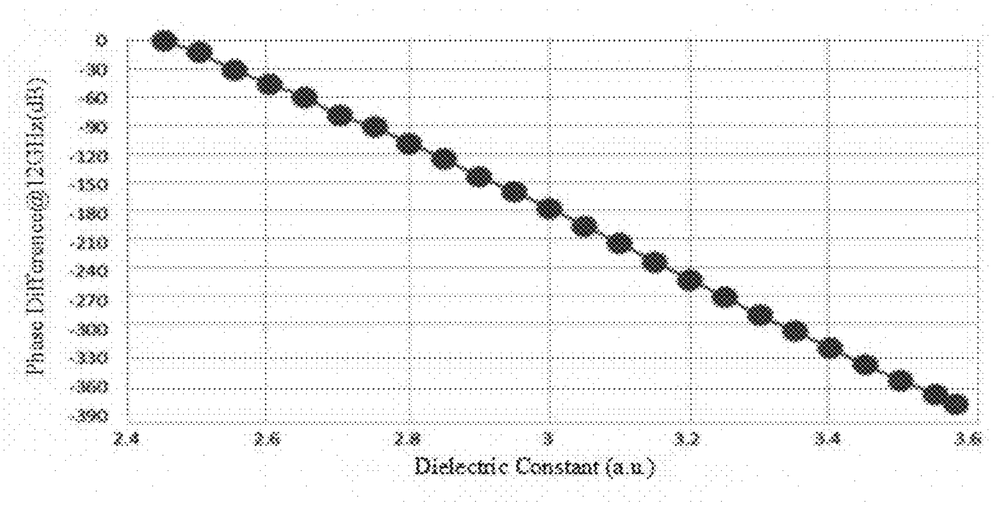
FIG. 27 is a simulation graph illustrating a dielectric constant varying with phase difference of an antenna according to an embodiment of the present disclosure.

Referring to FIG. 26 and FIG. 27, FIG. 26 and FIG. 27 are graphs illustrating simulation results for the antenna shown in FIG. 18. FIG. 26 is a graph illustrating a dielectric constant and transmission loss of the antenna, and FIG. 27 is a graph illustrating a dielectric constant and phase difference of the antenna. As can be seen from the FIG. 26 and FIG. 27, the fluctuation of the transmission loss of the antenna provided by the embodiment of the present disclosure is only 1.8 at the various dielectric constants, and the phase shift may be maintained, so that the transmission loss can be effectively reduced by using the waveguide structures (including the first waveguide structure 70 and the second waveguide structure 80) and the feeding structures (including the first feeding structure 50 and the second feeding structure 60) for signal transmission.

It will be understood that, the above embodiments are merely exemplary embodiments adopted to illustrate the principles of the present disclosure, and the present disclosure is not limited thereto. It will be apparent to those skilled in the art that, various modifications and improvements could be made without departing from the spirit and scope of the disclosure, and such modifications and improvements should be considered to be within the scope of the present disclosure.

What is claimed is:

1. A phase shifter, which is divided into a first feeding region, a second feeding region and a phase-shift region, the phase shifter comprising a first substrate and a second substrate arranged opposite to each other, and a dielectric layer between the first substrate and the second substrate; wherein the first substrate comprises a first base substrate, and a signal line and a reference electrode provided on a side of the first base substrate close to the dielectric layer; and the signal line and the reference electrode are located in the phase-shift region; the signal line comprises a main structure and at least one branch structure connected to the main structure, and the at least one branch structure extends along an extending direction of the main structure; and the second substrate comprises a second base substrate, and at least one patch electrode provided on a side of the second base substrate close to the dielectric layer and located in the phase-shift region; the at least one patch electrode is provided corresponding to the at least one branch structure to form at least one variable capacitor; and an orthographic projection of the at least one patch electrode on the first base substrate at least partially overlaps with an orthographic projection of the at least one branch structure on the first base substrate;

wherein the phase shifter further comprises:

a first feeding structure and a second feeding structure, the first feeding structure being electrically coupled to one end of the signal line, and the second feeding structure being electrically coupled to the other end of the signal line; the first feeding structure being located in the first feeding region; and the second feeding structure being located in the second feeding region; and at least one recess formed in the first base substrate and/or in the second base substrate; the at least one recess located at an edge of the first feeding region and/or at an edge of the second feeding region, and each of the at least one recess being filled with a conductive structure.

2. The phase shifter of claim 1, wherein the phase shifter further comprises a first waveguide structure located in the first feeding region; the at least one recess comprises a first recess located in the first feeding region; and an orthographic projection of the first feeding structure on the first base substrate at least partially overlaps with an orthographic projection of a first port of the first waveguide structure on the first base substrate; and the first port of the first waveguide structure is connected to a surface of the first base substrate away from the dielectric layer, the first recess is formed in the first base substrate, and a sidewall of the first waveguide structure covers an opening of the first recess; or the first port of the first waveguide structure is connected to a surface of the second base substrate away from the dielectric layer, the first recess is formed in the second base substrate, and a sidewall of the first waveguide structure covers an opening of the first recess.

3. The phase shifter of claim 2, wherein the phase shifter further comprises a second waveguide structure located in the second feeding region, the at least one recess further comprises a second recess located in the second feeding region; an orthographic projection of the second feeding structure on the first base substrate at least partially overlaps with an orthographic projection of a first port of the second waveguide structure on the first base substrate;

the first port of the second waveguide structure is connected to the surface of the first base substrate away from the dielectric layer, the second recess is formed in the first base substrate, and a sidewall of the second waveguide structure covers an opening of the second recess; or the first port of the second waveguide structure is connected to the surface of the second base substrate away from the dielectric layer, the second recess is formed in the second base substrate, and a sidewall of the second waveguide structure covers an opening of the second recess.

4. The phase shifter of claim 3, wherein the orthographic projection of the first feeding structure on the first base substrate is within the orthographic projection of the first port of the first waveguide structure on the first base substrate; and/or the orthographic projection of the second feeding structure on the first base substrate is within in the orthographic projection of the first port of the second waveguide structure on the first base substrate.

5. The phase shifter of claim 3, wherein the first waveguide structure is provided on the side of the first base substrate away from the dielectric layer, and the second waveguide structure is provided on the side of the second base substrate away from the dielectric layer; or both the first waveguide structure and the second waveguide structure are provided on the side of the second base substrate away from the dielectric layer, and the orthographic projection of the first waveguide structure on the second base substrate does not overlap with the orthographic projection of the second waveguide structure on the second base substrate.

6. The phase shifter of claim 3, wherein the phase shifter further comprises a first reflection structure and a second reflection structure;

the first reflection structure is provided on a side of the first feeding structure away from the first waveguide structure, an orthographic projection of the first reflection structure on the first base substrate at least partially overlaps with the orthographic projection of the first port of the first waveguide structure on the first base substrate and at least partially overlaps with the orthographic projection of the first feeding structure on the first base substrate, and the first reflection structure is configured to reflect a microwave signal radiated by the first feeding structure towards a side deviating from the first waveguide structure, back into the first waveguide structure; and the second reflection structure is provided on a side of the second feeding structure away from the second waveguide structure, an orthographic projection of the second reflection structure on the second base substrate at least partially overlaps with the orthographic projection of the first port of the second waveguide structure on the second base substrate and at least partially overlaps with the orthographic projection of the second feeding structure on the second base substrate, and the second reflection structure is configured to reflect a microwave signal, radiated by the second feeding structure towards a side deviating from the second waveguide structure, back into the second waveguide structure.

7. The phase shifter of claim 6, wherein the first reflection structure is a waveguide structure, and an orthographic projection of a first port of the first reflection structure on the first base substrate at least partially overlaps with the orthographic projection of the first port of the first waveguide structure on the first base substrate; and the second reflection structure is a waveguide structure, and an orthographic projection of a first port of the second reflection structure on the second base substrate at least partially overlaps with the orthographic projection of the first port of the second waveguide structure on the second base substrate.

8. The phase shifter of claim 7, wherein the at least one recess further comprises a third recess in the first feeding region;

the first port of the first reflection structure is connected to the surface of the first base substrate away from the dielectric layer, the third recess is formed in the first base substrate, and a sidewall of the first reflection structure covers an opening of the third recess; or the first port of the first reflection structure is connected to the surface of the second base substrate away from the dielectric layer, the third recess is formed in the second base substrate, and a sidewall of the first reflection structure covers an opening of the third recess.

9. The phase shifter of claim 7, wherein the at least one recess further comprises a fourth recess in the second feeding region;

the first port of the second reflection structure is connected to the surface of the first base substrate away from the dielectric layer, the fourth recess is formed in the first base substrate, and a sidewall of the second reflection structure covers an opening of the fourth recess; or the first port of the second reflection structure is connected to the surface of the second base substrate away from the dielectric layer, the fourth recess is formed in the second base substrate, and a sidewall of the second reflection structure covers an opening of the fourth recess.

10. The phase shifter of claim 3, wherein the first waveguide structure has at least one first sidewall which is connected together to form a waveguide cavity of the first waveguide structure; and/or the second waveguide structure has at least one second sidewall which is connected together to form a waveguide cavity of the second waveguide structure; or the phase shifter further comprises a first metal layer and a second metal layer; the first metal layer is provided on a side of the first base substrate away from the dielectric layer, the first metal layer is provided with a first cavity therein, the first cavity defines the first waveguide structure, the second metal layer is provided on a side of the second base substrate away from the dielectric layer, the second metal layer is provided with a second cavity therein to define the second waveguide structure; or the phase shifter further comprises a second metal layer provided on a side of the second base substrate away from the dielectric layer; the second metal layer is provided with a first cavity and a second cavity, the first cavity defines the first waveguide structure, the second cavity defines the second waveguide structure; and an orthographic projection of the first cavity on the second base substrate does not overlap with an orthographic projection of the second cavity on the second base substrate.

11. The phase shifter of claim 3, wherein the phase shifter further comprises a third substrate connected to a second port of the first waveguide structure; the third substrate comprises a third base substrate and a feeding transmission line provided on a side of the third base substrate close to the first waveguide structure; and a first end of the feeding transmission line is connected to an external signal line, and a second end of the feeding transmission line extends into the second port of the first waveguide structure so as to feed a signal into the first waveguide structure; or an orthographic projection of the signal line on the first base substrate does not overlap with the orthographic projection of the first port of the first waveguide structure on the first base substrate and an orthographic projection of the first port of the second waveguide structure on the first base substrate.

12. The phase shifter of claim 3, wherein the first waveguide structure and/or the second waveguide structure has a filling medium therein, and the filling medium comprises polytetrafluoroethylene.

13. The phase shifter of claim 1, wherein the at least one recess is located in the first feeding region and formed in the first base substrate, and the at least one recess comprises a plurality of recesses arranged in a ring;

the at least one recess is located in the first feeding region and formed in the second base substrate, and the at least one recess comprises a plurality of recesses arranged in a ring;

the at least one recess is located in the second feeding region and formed in the first base substrate, and the at least one recess comprises a plurality of recesses arranged in a ring; or the at least one recess is located in the second feeding region and formed in the second base substrate, and the at least one recess comprises a plurality of recesses arranged in a ring.

14. The phase shifter of claim 1, wherein the first feeding structure is a monopole electrode provided in a same layer as the signal line and made of a same material as the signal line; and/or the second feeding structure is a monopole electrode provided in a same layer as the signal line and made of a same material as the signal line; and/or the signal line has at least one bending corner, the reference electrode has at least one bending corner, and the at least one bending corner of the reference electrode is provided in one-to-one correspondence with the at least one bending corner of the signal line; and/or the reference electrode comprises a first sub-reference electrode and a second sub-reference electrode; the signal line is provided between the first sub-reference electrode and the second sub-reference electrode; and an orthographic projection of each of the at least one patch electrode on the first base substrate at least partially overlaps with orthographic projections of the first sub-reference electrode and second sub-reference electrode of the reference electrode on the first base substrate.

15. An antenna, comprising at least one phase shifter, each of which is the phase shifter of claim 1.

16. The antenna of claim 15, wherein the phase shifter further comprises a second waveguide structure provided corresponding to the second feeding structure; and the antenna further comprises at least one radiation unit, one of which is provided corresponding to the second port of the second waveguide structure of one of the at least one phase shifter.

17. The antenna of claim 16, wherein each of the at least one radiation unit is a third waveguide structure comprising a first port close to the second waveguide structure and a second port away from the second waveguide structure, the first port of the third waveguide structure is connected to the second port of the corresponding second waveguide structure; and a size of an opening of the second port of the third waveguide structure is larger than a size of an opening of the first port of the third waveguide structure, and a size of an opening of the third waveguide structure at a position relatively away from the second waveguide structure is not smaller than a size of an opening of the third waveguide structure at a position relatively close to the second waveguide structure.

18. The antenna of claim 17, wherein the second waveguide structure comprises four second sidewalls which are connected together to define a waveguide cavity of the second waveguide structure;

the third waveguide structure comprises one third sidewall, and the third sidewall surrounds to form a waveguide cavity of the third waveguide structure; and along a direction from the waveguide cavity of the second waveguide structure towards the waveguide cavity of the third waveguide structure, a shape of the waveguide cavity of the second waveguide structure gradually transitions to a shape of the first port of the waveguide cavity of the third waveguide structure.

19. The antenna of claim 16, wherein the radiation unit comprises a radiation patch; the antenna further comprises a fourth substrate, the second port of the second waveguide structure of each of the at least one phase shifter is connected to the fourth substrate, and the radiation patch is provided on a side of the fourth substrate away from the second waveguide structure; and an orthographic projection of the radiation patch on the fourth substrate at least partially overlaps with an orthographic projection of the second port of the second waveguide structure corresponding to the radiation patch on the fourth substrate.

20. The antenna of claim 16, wherein the phase shifter further comprises a first waveguide structure provided corresponding to the first feeding structure; the at least one radiation unit comprises a plurality of radiation units and the at least one phase shifter comprises a plurality of phase shifters, and one of the plurality of radiation units is provided corresponding to the second port of the second waveguide structure of one of the plurality of phase shifters; and first waveguide structures of the plurality of phase shifters are connected to form a waveguide power division network, the waveguide power division network has a main port and a plurality of sub-ports, the main port of the waveguide power division network is connected to an external signal line, and the first port of each of the first waveguide structures serves as one sub-port of the waveguide power division network.

* * * * *